US012675261B2

(12) United States Patent
Leblond et al.

(10) Patent No.: US 12,675,261 B2
(45) Date of Patent: Jul. 7, 2026

(54) COMPUTER CODE GENERATION FROM TASK DESCRIPTIONS USING NEURAL NETWORKS

(71) Applicant: GDM Holding LLC, Mountain View, CA (US)

(72) Inventors: Rémi Leblond, Cachan (FR); Alaa Saade, Montreuil (FR); Corentin Tallec, Paris (FR); Felix Axel Gimeno Gil, London (GB); Florent Altché, Paris (FR); Jean-Bastien François Laurent Grill, Paris (FR); Matthias Heinz Lochbrunner, London (GB); Paul Caron, Levallois-Perret (FR); Anton Ruddock, London (GB); George Powell, London (GB); Michael Fabien Serge Mathieu, Potters Bar (GB); Maciej Mikula, London (GB)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 18/970,673

(22) Filed: Dec. 5, 2024

(65) Prior Publication Data

US 2025/0181325 A1 Jun. 5, 2025

Related U.S. Application Data

(60) Provisional application No. 63/606,552, filed on Dec. 5, 2023.

(51) Int. Cl.
*G06F 9/44* (2018.01)
*G06F 8/35* (2018.01)

(52) U.S. Cl.
CPC ..................................... *G06F 8/35* (2013.01)

(58) Field of Classification Search
None
See application file for complete search history.

(56) References Cited

U.S. PATENT DOCUMENTS

| | | | | |
|---|---|---|---|---|
| 12,106,038 | B1 * | 10/2024 | Delpisheh | G06F 40/30 |
| 2013/0346982 | A1 * | 12/2013 | Kalai | G06N 20/00 |
| | | | | 718/100 |

(Continued)

OTHER PUBLICATIONS

Adiwardana et al., "Towards a human-like open-domain chatbot," CoRR, Jan. 27, 2020, arxiv.org/abs/2001.09977, 38 pages.

(Continued)

*Primary Examiner* — Lanny N Ung
(74) *Attorney, Agent, or Firm* — Fish & Richardson P.C.

(57) ABSTRACT

Methods, systems, and apparatus, including computer programs encoded on computer storage media, for generating computer code using neural networks. One of the methods includes receiving data describing a computer programming task; generating a plurality of candidate computer programs by sampling a plurality of output sequences from a set of one or more generative neural networks; clustering the plurality of candidate computer programs; for each cluster in a set of the clusters: processing each of the respective plurality of candidate computer programs in the cluster using a correctness estimation neural network to generate a correctness score for the candidate computer program; and selecting a representative computer program for the cluster using the correctness scores for the respective plurality of candidate computer programs in the cluster; and selecting one or more of the representative computer programs for the clusters as synthesized computer programs for performing the computer programming task.

30 Claims, 7 Drawing Sheets

(56) References Cited

U.S. PATENT DOCUMENTS

| | | | | |
|---|---|---|---|---|
| 2018/0011780 A1* | 1/2018 | Aggarwal | | G06F 11/36 |
| 2018/0349256 A1* | 12/2018 | Fong | | G06F 40/284 |
| 2019/0171422 A1* | 6/2019 | Udupa | | G06F 8/10 |
| 2021/0240320 A1* | 8/2021 | Woodward | | G06F 3/0481 |
| 2021/0390096 A1* | 12/2021 | Rahmfeld | | G10L 15/08 |
| 2022/0254006 A1* | 8/2022 | Jin | | G06V 10/764 |
| 2023/0029590 A1 | 2/2023 | Adiwardana et al. | | |
| 2023/0176829 A1* | 6/2023 | Rahmani | | G06F 40/40 |
| | | | | 717/110 |
| 2023/0342557 A1* | 10/2023 | Hasan | | G06N 20/00 |
| 2023/0351125 A1* | 11/2023 | Stahlberg | | G06F 40/58 |
| 2023/0401451 A1* | 12/2023 | Chen | | G06F 40/51 |
| 2023/0418565 A1* | 12/2023 | Arumugam Selvaraj | | |
| | | | | G06F 16/3322 |
| 2024/0143666 A1* | 5/2024 | Grushka | | G06F 16/907 |
| 2024/0354065 A1* | 10/2024 | Stephens | | G06F 8/30 |
| 2024/0394286 A1* | 11/2024 | Honke | | G06F 16/3344 |

OTHER PUBLICATIONS

Anil et al., "Gemini: A Family of Highly Capable Multimodal Models," CoRR, Dec. 19, 2023, arXiv:2312.11805, 90 pages.

Chowdhery et al., "PaLM: Scaling Language Modeling with Pathways," CoRR, Apr. 5, 2022, arxiv.org/abs/2204.02311, 87 pages.

Devlin et al., "BERT: Pretraining of deep bidirectional transformers for language understanding," CoRR, Oct. 11, 2018, arXiv:1810.04805, 16 pages.

Ellis et al., "DreamCoder: Growing generalizable, interpretable knowledge with wake-sleep Bayesian program learning, " CoRR, Jun. 15, 2020, arxiv.org/abs/2006.08381, 22 pages.

Li et al., "Competition-Level Code Generation with AlphaCode," CoRR, Feb. 8, 2022, arxiv.org/abs/2203.07814, 74 pages.

Pl et al., "Reasoning Like Program Executors," CoRR, Oct. 22, 2022, arXiv:2201.11473v2, 19 pages.

Raffel et al., "Exploring the limits of transfer learning with a unified text-to-text transformer," CoRR, Oct. 23, 2019, arXiv: 1910.10683, 67 pages.

Vaswani et al., "Attention Is All You Need," CoRR, Jun. 12, 2017, arXiv: 1706.03762, 15 pages.

Wang et al., "Voyager: An Open-Ended Embodied Agent with Large Language Models," CoRR, May 25, 2023, arxiv.org/abs/2305.16291, 42 pages.

Zelikman et al., "Parsel: Algorithmic Reasoning with Language Models by Composing Decompositions," CoRR, Dec. 20, 2022, arxiv.org/abs/2212.10561, 55 pages.

Zhao et al., "Calibrating Sequence likelihood Improves Conditional Language Generation," CoRR, Sep. 30, 2022, arxiv.org/abs/2210.00045, 19 pages.

International Search Report and Written Opinion in International Appln. No. PCT/EP2024/084833, mailed on Mar. 11, 2025, 19 pages.

Li et al., "Supplementary Materials for Competition-level code generation with AlphaCode," Science, Dec. 9, 2022, 378(6624): 1092-1097.

* cited by examiner

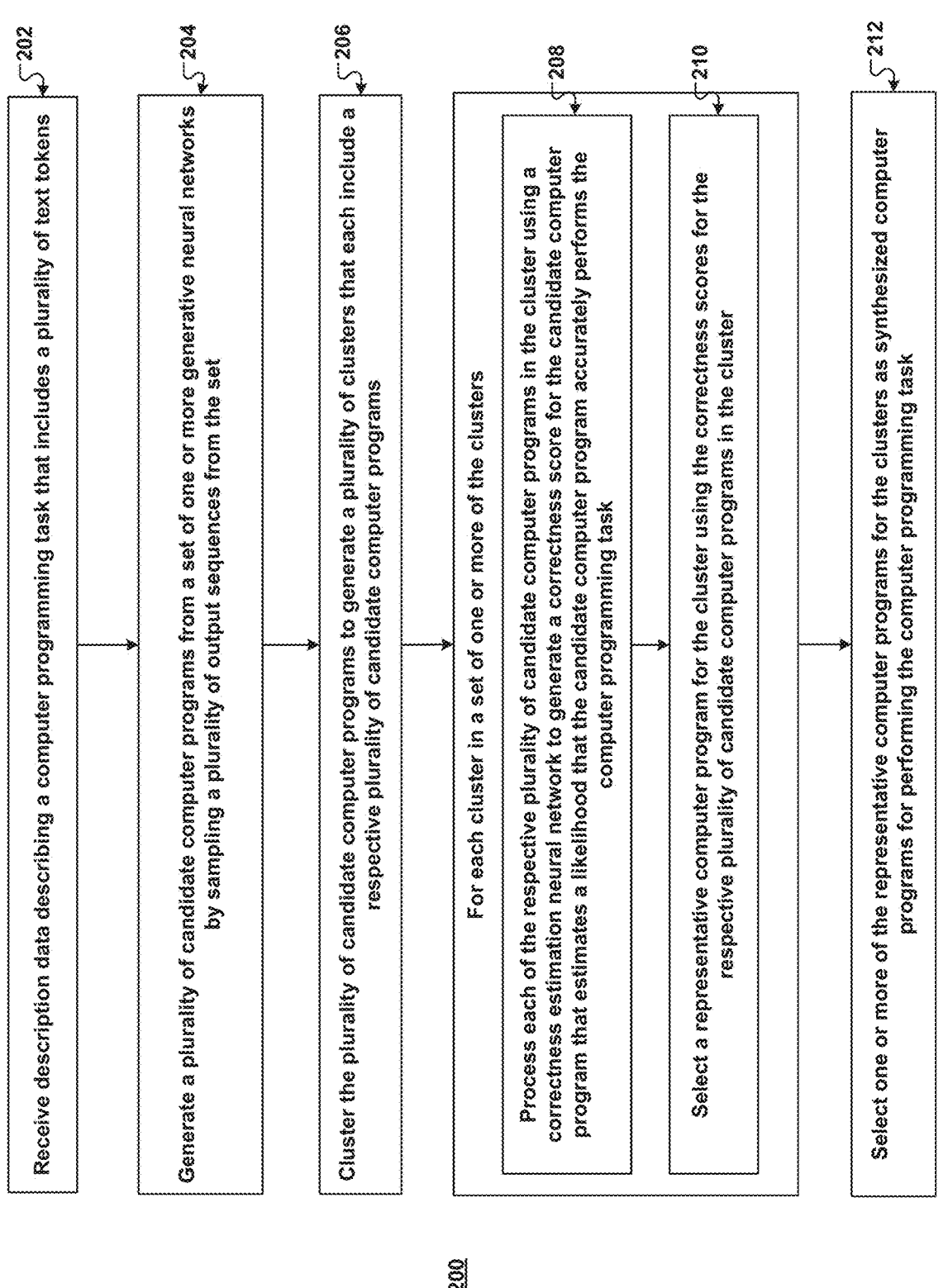

200

Receive description data describing a computer programming task that includes a plurality of text tokens ⟋202

Generate a plurality of candidate computer programs from a set of one or more generative neural networks by sampling a plurality of output sequences from the set ⟋204

Cluster the plurality of candidate computer programs to generate a plurality of clusters that each include a respective plurality of candidate computer programs ⟋206

For each cluster in a set of one or more of the clusters

Process each of the respective plurality of candidate computer programs in the cluster using a correctness estimation neural network to generate a correctness score for the candidate computer program that estimates a likelihood that the candidate computer program accurately performs the computer programming task ⟋208

Select a representative computer program for the cluster using the correctness scores for the respective plurality of candidate computer programs in the cluster ⟋210

Select one or more of the representative computer programs for the clusters as synthesized computer programs for performing the computer programming task ⟋212

FIG. 2

402 — Obtain Language Model Training Data Set

404 — Pre-Train On Language Model Training Data Set

406 — Obtain Code Generation Training Data Set

408 — Fine-Tune On Code Generation Training Data Set

410 — Obtain Different Code Generation Training Data Set

412 — Fine-Tune On Different Code Generation Training Data Set

400

502

504

Obtain Code Correctness Estimation Training Data Set

Fine-Tune On Code Correctness Estimation Training Data Set

500

600

602

Obtain Test Input Generation Training Data Set

604

Fine-Tune On Test Input Generation Training Data Set

700

COMPUTER CODE GENERATION FROM TASK DESCRIPTIONS USING NEURAL NETWORKS

CROSS-REFERENCE TO RELATED APPLICATIONS

This application claims priority of U.S. Provisional Application No. 63/606,552, filed Dec. 5, 2023. The contents of the prior application is incorporated herein by reference in its entirety.

BACKGROUND

This specification relates to generating computer code using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

SUMMARY

This specification describes a system implemented as computer programs on one or more computers in one or more locations that generates computer program code using a neural network. In particular, the system receives an input that includes description data describing a computer programming task and generates as output one or more computer programs that, when executed, carry out the computer programming task described in the description data.

Particular embodiments of the subject matter described in this specification can be implemented so as to realize one or more of the following advantages.

Generating code that solves a specified task requires searching in a huge, structured space of possible computer programs, with a very sparse reward signal. For example, single character edits can completely change program behavior even if they do not cause crashes, solutions can look dramatically different even for the same problem, and judging if a partial or incorrect program is useful is a difficult challenge. Thus, generating an entire program in a general-purpose programming language such as C++ or Python starting from a natural language task description has been an open problem.

This specification describes techniques for efficiently leveraging a set of one or more generative neural networks to accurately generate computer programs conditioned on natural language descriptions. In particular, the described techniques address the problem of searching the huge, structured space by using generative neural networks, e.g., Transformer models, to generate a large set of program samples and then one or more of filtering, clustering, and scoring the results using corresponding inputs to obtain a small set of candidates to be proposed as synthesized computer programs. In some cases, to improve the diversity of the generated samples, the techniques make use of "metadata conditioning".

Moreover, the described system can pre-train the generative neural networks on code sequences and then fine-tune on a set of task-specific data to ensure that the generative neural networks can generate high-quality candidates even when the amount of task-specific training data is limited. The described system can also pre-train and then fine-tune each of the one or more generative neural networks with various different hyperparameters.

Furthermore, the described system can use a correctness estimation neural network to score and rank candidate computer programs to enhance the likelihood of selecting suitable synthesized computer programs.

Additionally, the described system can condition the generation of candidate computer programs on natural language description of how to solve the computer programming task to efficiently reduce the huge, structured space, improving efficiency by improving generation of relevant candidate computer programs.

Additionally, the described approach is designed to be particularly efficient when implemented on parallel processing hardware. In particular, a system can perform the generating of the candidates and the sampling of the output sequences in parallel. For example, the system can use a plurality of parallel processing devices, e.g., CPUs, GPUs, TPUs, or other ASICs, FPGAs, and so on, to perform the generation and sampling in parallel. As a particular example, the system can deploy multiple instances of each of the one or more generative neural networks across the devices. For example, the system can deploy each instance on a different device or deploy an instance across multiple devices using model parallelism techniques. The system can then, for each instance, sample candidates as described above using the instance in parallel with each other instance. The system can further parallelize the code generation process by evaluating the candidates in parallel on the same devices on which they were generated.

The details of one or more embodiments of the subject matter of this specification are set forth in the accompanying drawings and the description below.

According to a first aspect there is provided a method performed by one or more computers. The method includes receiving description data describing a computer programming task, where the description data includes a plurality of text tokens. The method further includes generating a plurality of candidate computer programs by sampling a plurality of output sequences from a set of one or more generative neural networks. Each of the generative neural network in the set is configured to receive an input sequence that includes the plurality of text tokens in the description data and to process the input sequence to generate an output sequence, where the output sequence includes a plurality of computer code tokens that specifies a candidate computer program for performing the computer programming task described by the description data. The method then further includes clustering the plurality of candidate computer programs to generate a plurality of clusters that each include a respective plurality of candidate computer programs and, for each cluster in a set of one or more of the clusters, processing each of the respective plurality of candidate computer programs in the cluster using a correctness estimation neural network to generate a correctness score for the candidate computer program. The correctness score for the candidate computer program estimates a likelihood that the candidate computer program accurately performs the computer programming task. The method also further includes selecting a representative computer program for the cluster using the correctness scores for the respective plurality of candidate computer programs in the cluster and selecting one or more of the representative computer programs for the clusters as synthesized computer programs for performing the computer programming task.

In some implementations, generating the plurality of candidate computer programs includes generating a plurality of initial candidate computer programs, each initial candidate computer program being specified by a respective one of the plurality of output sequences, and filtering the plurality of initial candidate computer programs to generate the plurality of candidate computer programs.

In some implementations, the method further includes obtaining a first set of one or more inputs for the computer programming task and, for each input in the first set, one or more expected outputs. For such implementations, the filtering includes discarding any initial candidate computer program that does not generate, for each input in the first set, an output that matches any of the one or more expected outputs for the input.

In some cases, the filtering includes discarding any initial candidate computer program that does not compile.

In some implementations, clustering the plurality of candidate computer programs includes obtaining a test set of test inputs for the computer programming task and, for each candidate computer program and for each test input in the test set, executing the candidate computer program on the test input to generate an output. For such implementations, the clustering the plurality of candidate computer programs also further includes clustering the plurality of candidate computer programs based at least in part on the outputs generated by executing the candidate computer programs on the test inputs.

In some implementations, obtaining the test set of test inputs for the computer programming task includes processing a natural language description of inputs for the computer programming task using a test input generation neural network to generate as output one or more test inputs for the computer programming task.

In some cases, processing the natural language description using a test input generation neural network includes processing a description sequence generated from the natural language description using a language model neural network to generate a specification of the inputs to the computer programming task in a compact domain specific language. Then generating the one or more test inputs from the specification of the inputs to the computer programming task.

In some cases, the specification of the inputs identifies each variable that is included in a given input and specifies a respective set of constraints on a value of each of the variables.

In some cases, generating the one or more test inputs from the specification includes, for each test input, generating a respective value for each variable that satisfies the respective set of constraints on the value of the variable.

In some cases, the natural language description of inputs is a subset of the description data.

In some cases, the set of one or more generative neural networks includes a plurality of generative neural networks.

In some cases, each generative neural network is a respective language model neural network.

Further in some cases, each generative neural network has been initialized from a respective pre-trained language model neural network.

Further in some cases, each generative neural network has been fine-tuned on a respective first set of code generation training data in accordance with a respective set of hyperparameters.

Further in some cases, each generative neural network has been further fine-tuned on a respective second set of code generation training data.

In some cases, selecting a representative computer program for the cluster using the correctness scores for the respective plurality of candidate computer programs in the cluster includes selecting the candidate computer program with the highest correctness score.

In some implementations, the method further includes ranking the plurality of clusters according to a respective cardinality of each of the clusters and selecting, for inclusion in the set of one or more clusters, one or more highest-ranked clusters.

In some implementations, the method further includes ranking the plurality of clusters based on, for each of the clusters, a respective cardinality of the cluster and a respective measure of central tendency of correctness scores generated by the correctness estimation neural network for the candidate computer programs in the cluster. Then selecting, for inclusion in the set of one or more clusters, one or more highest-ranked clusters.

In some cases, the measure of central tendency is a mean, median, or maximum of the correctness scores.

In some cases, the correctness estimation neural network is a language model neural network.

Further in some cases, the correctness estimation neural network has been initialized from a pre-trained language model neural network and fine-tuned on a training data set that includes a plurality of training examples, each training example including a respective computer program.

Further in some cases, the plurality of training examples includes a plurality of training examples that include a computer program generated by one or more machine learning models and a plurality of training examples that include a human-generated computer program.

Further in some cases, the one or more machine learning models include one or more of the generative neural networks.

In some implementations, the method further includes receiving a new input for the computer programming task and executing one or more of the synthesized computer programs on the new input to generate an output for the computer programming task for the new input.

In some cases, the set of one or more generative neural networks includes only a single generative neural network.

In some cases, sampling a plurality of output sequences from a set of one or more generative neural networks includes sampling each output sequence in accordance with a respective sampling temperature. Also, for these cases, two or more output sequences are sampled with respective different sampling temperatures.

In some cases, one or more of the generative neural networks in the set include an encoder neural network configured to process the input sequence to generate an encoded representation of the input sequence and a decoder neural network configured to process the encoded representation to generate the output sequence.

Further in some cases, the encoder neural network is a Transformer encoder that applies self-attention over the input sequence and the decoder neural network is an auto-regressive Transformer decoder that applies cross-attention into the encoded representation.

In some cases, one or more of the generative neural networks are causally-masked decoder-only Transformer neural networks.

In some implementations, sampling a plurality of output sequences from a set of one or more generative neural networks includes repeatedly performing operations that include generating a current input sequence from the description data and sampling one or more output sequences by processing the current input sequence using one of the generative neural networks in the set.

In some implementations, the operations are performed in parallel across a plurality of hardware devices.

Further in some implementations, each input sequence includes the plurality of text tokens from the description data and one or more tokens identifying a programming language. For such implementations, generating a current input sequence from the description data includes selecting a programming language and including one or more tokens identifying the selected programming language in the current input sequence.

Further in some implementations, selecting a programming language includes selecting a same programming language for each current input sequence.

Further in some implementations, during training, the one or more generative neural networks were trained on computer programs written in a plurality of programming languages.

In some implementations, each input sequence includes the plurality of text tokens from the description data and one or more tokens indicating whether the output sequence generated by the generative neural network should specify a correct or incorrect solution for the computer programming task. For such implementations, generating a current input sequence from the description data includes including one or more tokens indicating that the output sequence generated by the generative neural network should specify a correct solution for the computer programming task.

In some implementations, each input sequence includes the plurality of text tokens from the description data and zero or more tags that each include one or more tokens and that identify an algorithm that should be implemented by the output sequence generated by the generative neural network. For such implementations, generating a current input sequence from the description data includes sampling one or more tags from a distribution over a set of tags and including the sampled tags in the current output sequence.

In some implementations, each input sequence includes the plurality of text tokens from the description data and one or more tokens that specify a difficulty rating for the computer programming task. For such implementations, generating a current input sequence from the description data includes selecting a difficulty rating for the computer programming task and including one or more tokens specifying the selected difficulty rating in the current output sequence.

Further in some implementations, selecting a difficulty rating for the computer programming task includes selecting a fixed difficulty rating that is the same for all computer programming tasks after training of the generative neural networks.

Further in some other implementations, selecting a difficulty rating for the computer programming task includes sampling a difficulty rating from a distribution over a set of difficulty ratings.

In some cases, each input sequence includes the plurality of text tokens from the description data and a sequence of tokens that represent a natural language description of how to solve the computer programming task.

In some implementations, the method further includes generating, from the description data, the sequence of tokens that represent the natural language description using an editorial generation neural network.

In some implementations, each generative neural network has been pre-trained on a language model training objective on a language model training data set and fine-tuned on a code generation objective on a respective first set of code generation training data that includes a plurality of training examples that each include (i) a training input sequence representing a computer programming task and (ii) a training output sequence that represents a computer program.

Further in some implementations, the language model training data set includes a set of sequences that each represent a segment of computer code.

In some implementations, the plurality of training examples includes a first subset of training examples for which the training output sequence in the training example is a correct solution to the computer programming task represented by the training input sequence in the training example. In addition, the plurality of training examples also includes a second set of training examples for which the training output sequence in the training example is not a correct solution to the computer programming task represented by the training input sequence in the training example.

In some implementations, the code generation objective is GOLD.

In some cases, the text tokens and the computer code tokens are selected from a same vocabulary of tokens.

In some cases, processing each of the respective plurality of candidate computer programs in the cluster using a correctness estimation neural network to generate a correctness score for the candidate computer program that estimates a likelihood that the candidate computer program accurately performs the computer programming task includes, for each candidate computer program, processing a correctness input sequence generated from the candidate computer program using the correctness estimation neural network to generate a correctness score for the candidate computer program.

In some cases, the correctness input sequence is generated from the candidate computer program and at least a subset of the description data.

According to a second aspect there is provided the methods of the first aspect performed by a system that includes one or more computers and one or more storage devices storing instructions that when executed by the one or more computers cause the one more computers to perform the respective operations of the respective method.

According to a third aspect there is provided the methods of the first aspect performed by one or more computer storage media storing instructions that when executed by one or more computers cause the one more computers to perform the respective operations of the respective method.

Other features, aspects, and advantages of the subject matter will become apparent from the description, the drawings, and the claims.

BRIEF DESCRIPTION OF THE DRAWINGS

FIG. 2 is a flow diagram of an example process for generating computer code.

DETAILED DESCRIPTION

Figure 1:
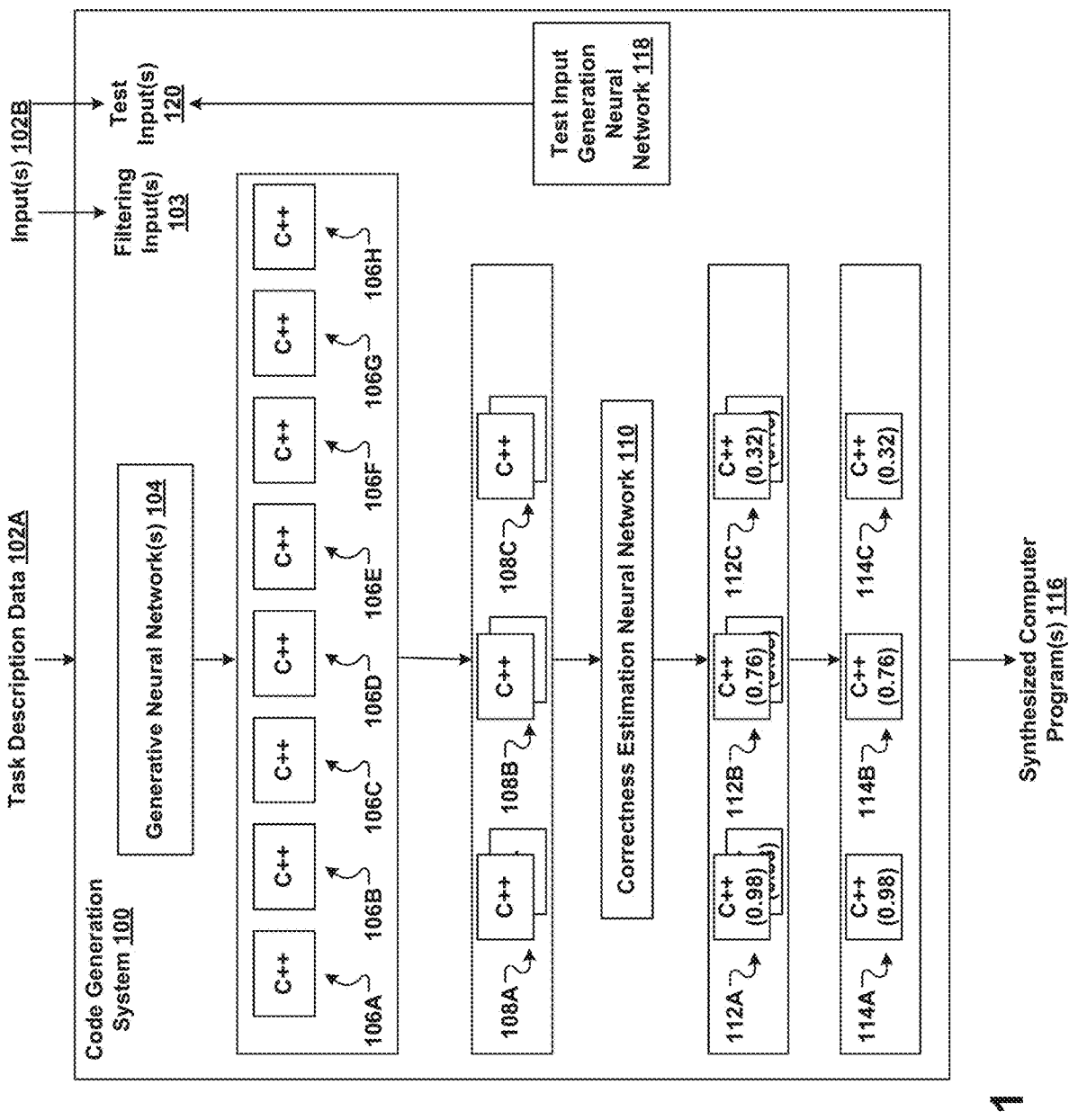
FIG. 1 shows an example code generation system.

FIG. 1 shows an example code generation system 100. The code generation system 100 is an example of a system implemented as computer programs on one or more computers in one or more locations, in which the systems, components, and techniques described below can be implemented.

The system 100 is a system that receives task description data 102A and generates one or more synthesized computer programs 116.

In particular, the system 100 receives description data 102A describing a computer programming task, i.e., describing the type of output that should be generated by executing a computer program on an input for the task.

Generally, the description data 102A includes natural language text describing the intended function of the computer program that is to be generated by the system 100. For example, the system 100 can receive natural language text as input from a user and generate the description data 102A from the natural language text.

The natural language text can be represented as a sequence of text tokens, e.g., tokens representing one or more of: characters, bytes, word pieces, words, punctuation marks, and so on.

For example, the system 100 can generate the sequence from a natural language input by applying a tokenizer, e.g., the SentencePiece tokenizer or another tokenizer, to divide the natural language input into tokens from the vocabulary.

For example, the system 100 can train the tokenizer on data that includes a mix of natural language text sequence and computer code segments in a variety of programming languages, e.g., Python, C++, C#, Java, Ruby, PHP, and so on, to ensure that the tokenizer can effectively tokenize programs from a range of programming languages, as well as the natural language descriptions of tasks that are received as input by the system 100.

The system 100 also obtains one or more sets of inputs 102B for the computer programming task. Each set of inputs 102B satisfies the requirements for inputs to the computer programming task, e.g., includes a respective value for each input variable that is required to perform the task. As a simplified example, when the task that is described by the description 102 requires sorting a set of input numbers, each input will include a set of numbers to be sorted.

In particular, the system 100 can obtain one or more sets of inputs 102B that include (i) a set of filtering inputs 103, (ii) a set of test inputs 120, or (iii) both.

The set of filtering inputs 103 includes a set of inputs and, for each input, a respective expected output generated by performing the computer programming task on the input. The filtering input-expected output pairs can be received as input by the system 100, e.g., from a user along with the description data 102A.

The set of test inputs 120 includes a set of inputs for the computer programming task but does not require that there be any expected outputs for the inputs.

As is described in more detail below, in some implementations, the system 100 generates some or all of the test inputs 120 from the description data 102A using a test input generation neural network 118. That is, the test input generation neural network 118 can process the description data 102A to generate test inputs 120.

Example techniques for training the test input generation neural network 118 will be described below.

The system 100 then generates a plurality of candidate computer programs 106A-H using the description data 102A.

In particular, the system 100 can generate the candidate computer programs 106A-H by sampling a plurality of output sequences from a set of one or more generative neural networks 104.

Each generative neural network 104 in the set is configured to receive an input sequence that includes the plurality of text tokens in the description data 102A and to process the input sequence to generate an output sequence that includes a plurality of computer code tokens that specifies a candidate computer program for performing the computer programming task described by the description data.

Each computer code token is selected from a vocabulary of tokens that represent code symbols in one or more computer programming languages, e.g., Python, C++, C#, Java, Ruby, PHP, and so on. For example, the vocabulary of tokens can be the same as the input vocabulary of tokens described above, e.g., the vocabulary employed by the tokenizer described above.

The neural network(s) 104 can have any appropriate neural network architecture that allows the model to map an input sequence of tokens from a vocabulary to an output sequence of tokens from the vocabulary.

For example, each neural network 104 can have an encoder-decoder architecture, i.e., an encoder neural network configured to process the input sequence to generate an encoded representation of the input sequence and a decoder neural network configured to process the encoded representation to generate the output sequence. For example, the encoder-decoder architecture can have a Transformer encoder that applies self-attention over the input sequence to generate an encoded representation of the input sequence and a Transformer decoder that applies cross-attention into the output of the Transformer.

As another example, each neural network 104 can have a decoder-only architecture, i.e., one or more of the generative neural networks are causally-masked decoder-only Transformer neural networks.

In particular, each neural network 104 can be an auto-regressive neural network that auto-regressively generates the output sequence of tokens by generating each particular token in the output sequence conditioned on a current input sequence that includes (i) the input sequence followed by (ii) any text tokens that precede the particular text token in the output sequence.

More specifically, to generate a particular token, the neural network 104 can process the current input sequence to generate a score distribution, e.g., a probability distribution, that assigns a respective score, e.g., a respective probability, to each token in the vocabulary of text tokens. For example, the penultimate layer of the neural network 104 can generate a score ("logit") for each token in the vocabulary and the final layer of the neural network 104 can be a softmax layer that maps the scores for the tokens to a probability distribution.

The neural network 104 can then select, as the particular text token, a text token from the vocabulary using the score distribution. For example, the neural network 104 can greedily select the highest-scoring token or can sample, e.g., using top-k sampling, nucleus sampling or another sampling technique, a token from the distribution.

Generally, because the neural network 104 is auto-regressive, by sampling from a distribution at each time step the system 100 can use the same neural network 104 to generate multiple different candidate output sequences in response to the same input. That is, by sampling tokens rather than selecting only the highest-scoring tokens, the system 100 introduces stochasticity into the generation process and can generate different sequences by processing the same input multiple times in parallel or sequentially.

Examples of auto-regressive Transformer architectures that can be used for the neural network 104 include those described in Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Ashish Vaswani, Noam Shazeer, Niki Parmar, Jakob Uszkoreit, Llion Jones, Aidan N. Gomez, Lukasz Kaiser, Illia Polosukhin Attention Is All You Need. arXiv preprint arXiv: 1706.03762, 2017; Gemini Team Google, et al., Gemini: A Family of Highly Capable Multimodal Models. arXiv: 2312.11805.

In some implementations, the architecture of the generative neural network(s) 104 can be modified relative to those described above to facilitate efficient sampling. For example, the generative neural network(s) 104 can employ multi-query attention instead of multi-head attention. In multi-query attention, each attention head within the encoder, the decoder, or both has different queries but shares the keys and the values. Because the key and values are shared, the sampling efficiency is improved and the number of parameters of the neural network 104 is reduced. In particular, memory usage and cache-updated costs, each of which represents a potential bottleneck during sampling, may be reduced through use of multi-query attention.

When there are multiple neural networks 104 in the set of generative neural networks 104, each generative neural network 104 has a different combination of values for a set of one or more properties from each other neural network 104 in the set. For example, the properties can include one or more of (i) training data used to train the generative neural network 104, (ii) initialized values of the parameters of the generative neural network 104 prior to training the generative neural network 104, (iii) a number of parameters of the generative neural network 104, (iv) a sampling temperature for sampling output sequences from the generative neural network 104, (v) training duration (i.e., training epoch count), or (vi) training hyperparameters (e.g., learning rate, batch size, and so on). Further details of sampling temperatures for sampling are described below.

By ensuring that each neural network 104 in the set has a different combination of values for this set of properties, the system 100 can ensure that the neural networks 104 can be used to generate a diverse set of outputs for a given input.

Prior to using the neural network(s) 104 to generate candidate computer programs, the system 100 or another training system trains the neural network(s) 104 on training data.

In some cases, as will be described in more detail below, the training system first pre-trains the neural network(s) 104 on a language model training objective on a language model training data set (e.g., a set of sequences that each represent a segment of computer code) and then fine-tunes the neural network(s) 104 on a code generation objective on a respective set of code generation training data.

In some other cases, as will be described in more detail below, the system 100 initializes each generative neural network 104 from a respective pre-trained language model neural network, and then the system 100 fine-tunes each generative neural network 104 on a respective set of code generation training data in accordance with a respective set of hyperparameters. Additionally, the system 100 can then further fine-tune each generative neural network 104 on a respective different set of code generation training data.

For each candidate computer program in a subset of the candidate computer programs 106A-H generated using the neural network(s) 104, and for each filtering input 103 in the one or more sets of inputs 102B, the system 100 executes the candidate computer program on the filtering input 103 to generate an output.

The system 100 can execute a computer program in any of a variety of ways.

For example, the system 100 can compile a given candidate computer program into an executable using an appropriate compiler and then cause a computer to execute the machine instructions in the executable.

As another example, the system 100 can execute the given candidate computer program using an appropriate interpreter that translates and executes the code in the computer program.

If a candidate program fails to compile or cannot be interpreted by the interpreter, the system 100 can remove the candidate program from consideration.

In some cases, the system 100 then selects from the candidate computer programs 106A-H, one or more candidate computer programs based at least in part on the outputs generated by executing the candidate computer programs 106A-H on the inputs in the set of filtering inputs 103. That is, the system 100 identifies candidate computer programs that fail to generate the expected outputs for all the respective filtering inputs 103 and removes the identified candidate computer programs from the subset of candidate computer programs.

For example, FIG. 1 illustrates eight candidate computer programs 106A-H, and it is possible that only six of the eight candidate computer programs 106A-H generate expected outputs for all the respective filtering inputs 103 (e.g., candidate computer programs 106A-F generate expected outputs while candidate computer programs 106G-H do not). Thus, the system 100 reduces the candidate computer program subset size from eight candidate computer programs to six candidate computer programs. For convenience, the description of FIG. 1 will continue assuming that the system 100 removes the candidate computer programs 106G-H from the set of candidate computer programs 106A-H, leaving candidate computer programs 106A-F.

Further details of filtering are described below.

The system 100 then clusters the plurality of candidate computer programs 106A-F to generate a plurality of clusters 108A-C that each include a respective plurality of candidate computer programs. For example, for FIG. 1, cluster 108A includes 106A-B, cluster 108B includes 106C-D, cluster 108C includes 106E-F and candidate computer programs 106G-H are not included in any of these clusters because the system 100 previously removed these programs from the set.

That is, the system 100 can cluster the candidate computer programs 106A-F into a plurality of clusters based on the outputs generated by executing the candidate computer programs 106A-F on the test inputs 120. The system 100 can use any appropriate clustering technique to cluster candidate computer programs 106A-F based on outputs generated by the test inputs 120. For example, the system 100 can group two candidate computer programs into the same cluster only if the two candidates generated matching outputs for at least a threshold proportion of the test inputs 120.

Matching outputs, in some cases, can refer to exact matches. That is, exact matches refer to outputs of programs being identical, e.g., a first program output of integer "123" and a second program output of integer "123" are exact matches.

In other cases, matching outputs refers to approximate matches, and approximate matches refer to outputs that are not exact matches but are the same within an acceptable tolerance. For example, if a numerical tolerance is $10^{-1}$ and a first program output is 1.05 and a second program output is 1.052, then the first program output and second program output are approximate matches because $1.05-1.052<10^{-1}$ and therefore the first and second program outputs are the same within the tolerance of $10^{-1}$.

In other cases still, matching outputs refers to semantic matches (i.e., outputs match in terms of intent of content). For example, a first program output of "the max element value is 125" and a second program output of "max element value: 125", are semantic matches because they share the same intent of conveying that 125 is the max element value despite not being exact matches in terms of formatting.

The system 100, for each cluster in a set of one or more of the clusters, processes each of the respective plurality of candidate computer programs in the cluster using a correctness estimation neural network 110 to generate a correctness score for the candidate computer program that estimates a likelihood that the candidate computer program accurately performs the computer programming task.

Generally, the correctness estimation neural network 110 can be any of a variety of neural networks that processes a correctness input sequence generated from the candidate computer program to generate a correctness score for the candidate computer program, where the correctness score is a measure, e.g., a probability, a logit, or other score, of the likelihood that a candidate computer program correctly performs the programming task described in the description data 102A.

For example, the correctness estimation neural network 110 can be any of a variety of neural networks that includes a fully connected last layer with a single neuron that uses the sigmoid activation function to produce a probability that represents the correctness score for the candidate computer program.

In some cases, the system 100 generates the correctness input sequence from the candidate computer program and at least a subset of the description data 102A. For example, the system 100 can append the code tokens that make up the candidate computer program to the text tokens that make up the description of a computer programming task from the description data 102A to generate a correctness input sequence.

In some cases, the correctness estimation neural network 110 is a language model neural network. As one example the correctness estimation neural network 110 can have the same neural network architecture as any of the generative neural networks 104. As another example, the correctness estimation neural network 110 does not have the same neural network architecture as any of the generative neural networks 104 and, for such cases, can instead have a neural network architecture that is a variant of any of the generative neural networks or can instead have a neural network architecture with different components than any of the generative neural networks.

Prior to using the correctness estimation neural network 110 to generate correctness scores, the system 100 or another training system trains the correctness estimation neural network 110 on training data.

In some cases, as will be described in more detail below, the training system initializes the correctness estimation neural network 110 from a pre-trained language model neural network and fine-tunes the neural network 110 on a training data set that includes a plurality of training examples, each training example including a respective computer program.

FIG. 1 illustrates the system 100 scoring the clusters 108A-C to create the scored clusters 112A-C (as indicated by the parenthetical scores) using the correctness estimation neural network 110 to process each candidate computer program for each cluster.

For each cluster in a set of one or more of the clusters, the system 100 then selects a representative computer program for the cluster using the correctness scores for the respective plurality of candidate computer programs in the cluster.

In some cases, the system 100 selects the candidate computer program with the highest correctness score as the representative computer program for the cluster.

For example, FIG. 1 illustrates that the system 100 selects representative computer programs 114A-C for respective scored clusters 112A-C, where the selected representative computer programs 114A-C each have the highest correctness score of their respective scored clusters 112A-C.

In other cases, before the system 100 selects a representative computer program for the cluster, the system selects, for inclusion in the set of one or more clusters, one or more clusters.

That is, in some implementations, the system 100 ranks the plurality of clusters, e.g., according to a respective cardinality of each of the clusters, and selects, for inclusion in the set of one or more clusters, one or more highest-ranked clusters.

In other implementations, the system 100 ranks the plurality of clusters based on a respective cardinality of the cluster and a respective measure of central tendency of correctness scores, e.g., the mean, median, or maximum of the correctness scores, generated by the correctness estimation neural network 110 for the candidate computer programs in the cluster. Then the system 100 selects, for inclusion in the set of one or more clusters, one or more highest-ranked clusters.

The system 100 selects one or more of the representative computer programs 114A-C for the clusters as synthesized computer programs 116 for performing the computer programming task.

In some cases, the system 100 selects one or more of the representative computer programs 114A-C for the clusters as synthesized computer programs 116 based at least in part on the correctness scores of the representative computer programs 114A-C.

For example, the system can select the representative computer programs 114A-C with correctness scores above a threshold.

As another example, the system can select one representative computer program 114A-C with the highest correctness score.

As another example, the system can select a pre-determined number of representative computer program 114A-C with the highest correctness score.

In some cases, the system 100 selects all the representative computer programs 114A-C.

In other cases, the system 100 randomly selects a subset of pre-determined size of the representative computer programs 114A-C.

Once the system 100 has selected the one or more synthesized computer programs 116, the system 100 can use the selected program(s) for any of a variety of tasks.

For example, the system 100 can provide the source code of each selected synthesized computer program 116 for presentation to a user in a user interface, e.g., to allow the user to select one of the selected synthesized computer programs for inclusion in a larger computer program being programmed by the user or to select one of the selected synthesized computer programs for modification prior to being used to perform the task.

As another example, the system 100 can directly use the selected synthesized computer program(s) 116 to perform the task. For example, the system 100 can receive a new input for the computer programming task, e.g., submitted by a user through user interface, provided by another computer program running on the same computer or on a remote computer, or received through an application programming interface (API) provided by the system 100, and execute one or more of the synthesized computer programs 116 on the new input to generate an output for the computer programming task for the new input. The system 100 can then provide one or more of the generated outputs as an output for the task. For example, when there is only a single selected synthesized computer program 116 or when each computer program 116 generates the same output, the system 100 can provide the single output as the output for the task. When there are multiple computer programs selected and the programs generate different outputs, the system 100 can provide the output generated by the largest number of programs as the output for the task.

FIG. 2. is a flow diagram of an example process 200 for generating computer code. For convenience, the process 200 will be described as being performed by a system of one or more computers located in one or more locations. For example, a code generation system, e.g., the code generation system 100 of FIG. 1, appropriately programmed in accordance with this specification, can perform the process 200.

The system receives description data describing a computer programming task that includes a plurality of text tokens (step 202).

The system can receive the description data from a user (e.g., through a user interface) or another system (e.g., a computer program executing a task, a networked source, e.g., a database).

For example, the system can receive the description data from a user using a command-line interface.

As another example, the system can receive the description data through an API (application programming interface) call.

As described above, generally, the description data describing a computer programming task includes natural language text, and the natural language text can be represented as a sequence of text tokens that may be generated using a tokenizer.

In some cases, as described above, the system also receives one or more sets of inputs (i.e., a set of filtering inputs, a set of test inputs, or both), where each input satisfies the requirements for inputs to the computer programming task, and each filtering input includes a respective expected output generated by performing the computer programming task on the input.

In some implementations, as described above, the system receives all of the test inputs as input from a user. In some other implementations, instead of or in addition to receiving test inputs as input, the system can generate one or more "synthetic" test inputs.

In particular, the system can process one or more description sequences that each include the plurality of text tokens from the description data describing the requirements of inputs for the computer programming task using a test input generation neural network. The test input generation neural network can be configured to process each description sequence to generate as output one or more test inputs for the computer programming task described by the description sequence. While these synthetic inputs are not guaranteed to be valid, especially when tasks have complex constraints, imperfect and even invalid test inputs can still be useful for grouping candidate programs.

In some cases, the system first uses a language model neural network to process the natural language description of the inputs (e.g., the one or more description sequences describing the requirements of the input for the task) to generate a specification in accordance with the description of the inputs in a compact domain specific language. Then, the system generates the one or more test inputs from the specification of the inputs.

For example, the system can use a pre-trained language model to process a prompt that includes a natural language description of the test inputs to generate a specification of the inputs to the computer programming task in a compact domain specific language. In particular, the system can use few-shot prompting (i.e., including a small number of example input-output pairs in a prompt to guide output generation) in order to generate a specification of the inputs to the computer programming task in a compact domain specific language that has a known format that can parsed with pre-defined programming functions. Then the system can parse this specification with a pre-defined programming function to determine the attributes of a test generator object (i.e., instantiate a programming language class object with arguments determined through parsing the specification). Then the system can repeatedly call the test generator object (i.e., the system can execute a member function of the test generator object) to generate test inputs that satisfy the original natural language description for the test inputs.

In some cases, the specification of the inputs identifies each variable that is included in a given input and specifies a respective set of constraints on the value of each of the variables.

For example, if an input is required to include the variable x, the specification can identify variable x and can identify and specify that it is an integer variable and can have a value within the range $[1, 10^8]$.

In some cases, when a set of constraints of the values of variables is present, the system generates the one or more test inputs from the specification by generating a respective value for each variable that satisfies the respective set of constraints on the value of the variable.

For example, consider the previous example of integer variable x having a constrained range of $[1,10^8]$, the system can generate one or more inputs in which the variable x for each input has a value greater than one, less than $10^8$, or any integer value in between.

In some cases, the natural language description of the inputs used to generate the test inputs is a subset of the description data. That is, the description data includes more than the natural language description of the inputs. For example, the description data can include the description of the computer task, a description of possible techniques to use to solve the computer task, criteria for the candidate solution that must be satisfied, and so on.

Further details of an example process for generating one or more test inputs from a specification of the inputs are described below with reference to FIG. 3.

The system generates a plurality of candidate computer programs from a set of one or more generative neural networks by sampling a plurality of output sequences from the set (step 204). Each generative neural network in the set is configured to receive an input sequence that includes the plurality of text tokens in the description data and to process the input sequence to generate an output sequence that includes a plurality of computer code tokens. The plurality of computer code tokens of the output sequence specify a candidate computer program for performing the computer programming task described by the description data.

In other words, the system uses the task description data and the generative neural network(s) to generate a large set of different candidate computer programs.

That is, the system generates one or more input sequences that each include the text tokens in the description data and, for each generated input sequence, samples a respective set of output sequences from each of one or more of the generative neural networks while the generative neural network is conditioned on the generated input sequence.

As described above, the one or more generative neural networks can be any of a variety of neural network types.

In some cases, the one or more generative neural networks is a plurality of generative neural networks. In other cases, the one or more generative neural networks is a single generative neural network.

In some cases, each of the one or more generative neural network is a respective language model neural network.

In some implementations, each generative neural network has been initialized from a respective pre-trained language model neural network. For example, each generative neural network can be initialized as a pre-trained model that was pre-trained on variety of natural language tasks such as summarization, instruction following, content generation, sentiment analysis, entity extraction, classification etc. As a particular example, each generative neural network can be initialized as the pre-trained Gemini Pro model (as described in ArXiv: 2312.11805). As another particular example, each generative neural network can be initialized as the pre-trained PaLM model (as described in ArXiv: 2204.02311)

In some cases, the system fine-tunes each generative neural network initialized from a respective pre-trained language model neural network.

For example, the system can fine-tune each generative neural network on a respective set of code generation training data in accordance with a respective set of hyper-parameters. As a particular example, the system can fine-tune each generative neural network on the same set of code generation training data, e.g., CodeContests data as described in arXiv: 2203.07814, with varying hyperparam-eters (training hyperparameters, model hyperparameters, or both) and yield a family of fine-tuned models.

In some cases, the system further fine-tunes each genera-tive neural network on a respective second set of code generation training data.

For example, the system can further fine-tune each gen-erative neural network of the previous example on a different code generation training data that may be of higher quality, e.g., the data set contains a smaller range of types of programming tasks that are more representative of the computer programming tasks that the system will receive through description data, or the data set contains more challenging programming tasks with more complex pro-gramming solutions, and so on.

The system can use any appropriate technique for sam-pling from a given generative neural network while the neural network is conditioned on the description data, e.g., nucleus sampling, reduced temperature sampling, greedy sampling, and so on.

In some implementations, the system samples a plurality of output sequences from a set of one or more generative neural networks with a sampling temperature (i.e., the system samples each output sequence in accordance with a respective sampling temperature), where two or more output sequences are sampled with respective different sampling temperatures.

The system can sample with a sampling temperature by adjusting the probabilities of any given token being selected as the next in the output sequence using a temperature hyperparameter. That is, the system can divide the output logits of a generative neural network (i.e., the scores gen-erated by the penultimate layer of the neural network) by a scalar temperature T before the softmax layer, to modify the probability mass function that determines the next token in the output sequence.

The temperature hyperparameter T therefore controls the balance of exploitation and exploration for sampling. A lower temperature T makes sampling more deterministic, while a higher temperature T makes the sampling less deterministic and enables more diverse and less likely output sequence to be generated. The system's use of the tempera-ture hyperparameter therefore provides a way to expand sampling space (by lowering the temperature) when novel programs that include less common code may be needed to perform the computer programming task described by the description data task. But the system can also use the temperature hyperparameter to narrow the sampling space (by raising the temperature) when less novel programs may be needed to perform a computer task. Consequently, the system's use of the temperature hyperparameter provides control over efficient sampling.

In some implementations, each input sequence includes only the text tokens in the description data, and the system relies on the stochastic nature of the sampling from a given neural network, the different outputs generated by different neural networks, or both to generate diverse candidates.

In some other implementations, each input sequence also includes "metadata" tokens that characterize desired prop-erties of the output sequence. For example, these metadata tokens can be inserted before or after the description data in the input sequence and can be formatted according to a specified format.

The metadata tokens can include tokens that specify any of a variety of properties of a computer program.

As one example, the metadata tokens can include one or more tokens identifying a programming language that the computer program is to be written in. For example, these tokens can be formatted as the tokens "LANGUAGE IS" followed by the name of a programming language, e.g., "Python" or "C++".

As another example, the metadata tokens can include one or more tokens indicating whether the output sequence generated by the generative neural network should specify a correct or incorrect solution for the computer programming task. For example, these tokens can be formatted as "COR-RECT SOLUTION" when a correct solution is desired and "INCORRECT SOLUTION" when an incorrect solution is desired.

As another example, the metadata tokens can include one or more tags that each identify an algorithm that should be implemented by the output sequence generated by the generative neural network, e.g., "divide and conquer", "dynamic programming", and "data structures." For example, these tokens can be formatted as "TAGS:" followed by identifiers for any algorithms that should be implemented. For some inputs, the input sequence can include zero tags, e.g., when no algorithm is well-adapted to the current task.

As another example, the metadata tokens can include one or more tokens that identify a difficulty rating for the task, e.g., as a numerical rating on a predefined rating scale. For example, these tokens can be formatted as "RATING:" followed by a numerical value.

As will be described in more detail below, during training, when generating an input sequence, the system generates these metadata tokens to match the actual properties of the output sequence that is provided as a target for the current input sequence. That is, the system includes metadata that indicates whether the program in the training example is a correct solution to the description represented by the input sequence in the training example, the actual difficulty rating for the task described by the input sequence, the actual computer language that the program in the training example is written in, the actual algorithms that are implemented within the program in the training example or that have otherwise been determined to be useful to the task described in the input sequence, and so on.

At sampling time, however, i.e., after the neural network(s) have been trained, the system can use "metadata conditioning" to improve the diversity and accuracy of the candidate programs.

That is, at sampling time, because the final computer program has not been generated yet, the system does not have access to the final computer programs that have been generated and therefore does not have access to the actual properties of the final computer programs.

Instead, the system uses "metadata conditioning" to, for each input sequence that is generated, select values for the properties that will result in metadata that generates high quality and diverse candidate programs.

As one example, when the metadata tokens include one or more tokens identifying a programming language that the computer program is to be written in, the system can, each time a current input sequence is being generated, sample a programming language from a distribution over a set of programming languages and include one or more tokens identifying the programming language in the current input sequence.

In some cases, instead of sampling a programming language from a distribution over a set of programming languages, the system selects a programming language.

In other cases, the selected programming language for the current input sequence is the same for each current input sequence, i.e., the system selects the same programming language for each current input sequence.

Further in these cases, prior to using the one or more generative neural networks to generate the candidate programs, the one or more generative neural networks were trained (e.g., pre-trained or fine-tuned) on computer programs written in a plurality of programming languages, such as Python, C++, C#, Java, Ruby, PHP, and so on.

As another example, when the metadata tokens include one or more tokens indicating whether the output sequence generated by the generative neural network should specify a correct or incorrect solution for the computer programming task, the system can, each time a current input sequence is being generated, include, in the current input sequence, one or more tokens indicating that the output sequence generated by the generative neural network should specify a correct solution for the computer programming task. i.e., because candidate programs that are not correct solutions are not useful at sampling time.

As another example, when the metadata tokens include one or more tags that each include one or more tokens that identify an algorithm that should be implemented by the output sequence generated by the generative neural network, the system can, each time a current input sequence is being generated, sample one or more tags from a distribution over a set of tags and include the sampled tags in the current output sequence.

As another example, when the metadata tokens include one or more tokens that identify a difficulty rating for the task, the system can select a difficulty rating for the computer programming task and include one or more tokens specifying the selected difficulty rating in the current output sequence.

For example, the system can either select a fixed difficulty rating that is the same for all computer programming tasks after training of the generative neural network(s) or sample a difficulty rating from a distribution over a set of difficulty ratings and use the sample difficulty rating as the selected difficulty rating.

Thus, to generate the candidate programs, i.e., to sample the plurality of output sequences that represent the candidate programs, the system repeatedly performs the following operations: (i) generating a current input sequence from the description data and (ii) sampling one or more output sequences by processing the current input sequence using one of the generative neural networks in the set. When "metadata conditioning" is employed, the system performs "metadata conditioning" as part of generating the current input sequence.

In some cases, part of generating the current input sequence includes the system including a sequence of tokens that represent a natural language description of how to solve the computer programming task.

For example, if the computer programming task includes a step of finding the median of an array of numbers, the natural language description could be "for the step of determining the median of the array of number, use quicksort".

In some implementations, the system uses an editorial generation neural network (i.e., a generative neural network capable of processing and generating natural language text tokens e.g., pre-trained language model, e.g., Gemini, or PaLM) to generate, from the description data, the sequence of tokens that represent the natural language description.

In some implementations, the system repeatedly performs multiple instances of the generating of the candidates and the sampling of the output sequences in parallel. For example, the system can use a plurality of parallel processing devices, e.g., CPUs, GPUs, TPUs, or other ASICS, FPGAs, and so on, to perform the generation and sampling in parallel. As a particular example, the system can deploy multiple instances of each of the one or more generative neural networks across the devices. For example, the system can deploy each instance on a different device or deploy an instance across multiple devices using model parallelism techniques. The system can then, for each instance, sample candidates as described above using the instance in parallel with each other instance.

In some of these implementations, the system can also perform the execution of the candidate programs in parallel across the multiple devices, e.g., by executing each candidate generated by a given instance on the device(s) on which the instance is deployed.

In some implementations, the system filters a plurality of initial candidate computer programs to generate the plurality of candidate computer programs. That is, the system generates a plurality of initial candidate computer programs and filters the plurality of initial candidate computer programs to generate the plurality of candidate computer programs.

For example, in some cases, when the system obtains a set of filtering inputs, for each initial candidate computer program and for each input in the set of filtering inputs, the system performs the execution of the initial candidate program on the input and discards any initial candidate computer program that does not generate an output that matches any of the one or more expected outputs for the input.

Additionally, in some cases, the system discards any initial candidate computer programs that does not compile. That is, if an initial candidate program fails to compile or cannot be interpreted by the interpreter, the system can remove the candidate program from consideration of belonging to the plurality of candidate computer programs.

Optionally, the system can maintain data specifying criteria for latency or resource consumption or both. If the execution of any (initial) candidate computer program fails any of the criteria for any execution, the system removes the candidate from consideration. Thus, the system can ensure that the subset of generated candidate computer programs are resource-efficient.

The system clusters the plurality of candidate computer programs to generate a plurality of clusters that each include a respective plurality of candidate computer programs (step 206).

In some implementations, when the system obtains a test set of test inputs for the computer programming task, for each candidate computer program and for each test input in the test set, the system executes the candidate computer program on the test input to generate an output. Then the system clusters the plurality of candidate computer programs based at least in part on the outputs generated by executing the candidate computer programs on the test inputs.

The system can use any appropriate clustering technique to cluster candidate computer programs based on outputs generated by the clustering inputs. For example, the system can group two candidates into the same cluster only if the two candidates generated matching outputs for at least a threshold proportion of the clustering inputs.

As another example, the system can cluster the candidate computer programs that produce all the same outputs for respective inputs (i.e., the produced respective outputs of each input form a signature that the system uses to cluster candidate computer programs).

In some implementations, after the system generates a plurality of clusters, the system ranks the plurality of clusters according to a respective cardinality of each of the clusters and selects, for inclusion in the set of one or more clusters, one or more highest-ranked clusters. For example, the system can select the top 1000, 100, or 10 highest-ranked clusters to include in the set of one or more clusters.

When the system clusters candidate computer programs based on similarity of outputs generated by the cluster inputs, selecting one or more highest-ranked clusters according to respective cardinality for inclusion in the set of one or more clusters filters the clusters for those clusters most likely to contain accurately performing candidate computer programs. Because incorrect outputs vary widely, while correct outputs tend to exhibit similar behavior, clusters with higher cardinality are more likely to include accurately performing candidate computer programs.

For each cluster in a set of one or more of the clusters, the system processes each of the respective plurality of candidate computer programs in the cluster using a correctness estimation neural network to generate a correctness score for the candidate computer program that estimates a likelihood that the candidate computer program accurately performs the computer programming task (step 208).

As described above, generally, the correctness estimation neural network processes a correctness input sequence generated from the candidate computer program to generate a correctness score for the candidate computer program.

Generally, the correctness score is a normalized value (a value between zero and one inclusive) such that, for example, a correctness score of 0.9 for candidate computer program signifies that the correctness estimation neural network estimates a 90% probability that the candidate computer program accurately performs the computer programming task. When the system trains the correctness estimation neural network, as will be described below, the target values (i.e., the values the model is trained to reproduce with the correctness score) are 1.0 (i.e., signifying that the candidate computer program does accurately perform the computer programming task, i.e., 100% probability of accurately performing the computer programming task) or 0.0 (i.e., signifying that the candidate computer program does not accurately performs the computer programming task, i.e., 0.0% probability of accurately performing the computer programming task). In this way, the correctness score of the candidate computer programs can be used to rank the candidate computer programs, relative to each other, according to their likelihoods of accurately performing the computer programming task.

As described above, in some cases, the system generates the correctness input sequence from the candidate computer program and at least a subset of the description data, e.g., the system generates a correctness input sequence by inserting the code tokens of the candidate computer program before or after the text tokens of the description data.

As another example, the system generates the correctness input sequence by inserting the code tokens of the candidate computer program before or after the input sequence that generated the candidate computer program (which contain the text tokens in the description data and potentially metadata tokens).

As described above, the correctness estimation neural network can be any of a variety of neural networks, but, in some cases, is a language model neural network. Additionally, the correctness estimation neural network may or may not have the same neural network architecture as any of the generative neural network(s).

Additionally, in some implementations, the correctness estimation neural network has been initialized from a pretrained language model neural network and fine-tuned on a training data set that includes a plurality of training examples, each training example including a respective computer program.

Further details of training the correctness estimation neural network are described below with reference to FIG. 5.

In some implementations, after the system generates a correctness score for each candidate computer program, the system ranks the plurality of clusters based on, for each of the clusters, a respective cardinality of the cluster and a respective measure of central tendency of correctness scores (e.g., mean, median, or maximum of the correctness scores) generated by the correctness estimation neural network for the candidate computer programs in the cluster. Then the system selects, for inclusion in the set of one or more clusters, one or more highest-ranked clusters.

For each cluster in a set of one or more of the clusters, the system selects a representative computer program for the cluster using the correctness scores for the respective plurality of candidate computer programs in the cluster (step 210).

The system may select a representative computer program for the cluster as the candidate computer program in any way. In some implementations, the system selects a representative computer program for the cluster as the candidate computer program with the highest correctness score in the cluster. As an alternative example, the system may select a representative computer program for the cluster as the candidate computer program randomly from a predefined number of the candidate computer programs in the cluster having the highest correctness scores in the cluster (e.g., from the top 2, 3, 4 or 5 candidate computer programs in the cluster).

The system can avoid picking exclusively semantically similar candidate computer programs (by avoiding picking from only one cluster) because semantically equivalent candidate computer programs belong to the same cluster (when the system clusters candidate computer programs based on similarity of outputs generated by the cluster inputs).

The system selects one or more of the representative computer programs for the clusters as synthesized computer programs for performing the computer programming task (step 212).

As described above, the system can select the one or more representative computer programs as synthesized computer programs in any of a variety of ways, e.g., select one or more representative computer programs with the highest correctness score, select all representative computer programs, randomly select a subset of the representative computer programs, and so on.

As described above, prior to using the generative neural network(s) to generate computer code, the system or a different training system trains the generative neural network(s). This is described in more detail below with reference to FIG. 4.

Figure 3:
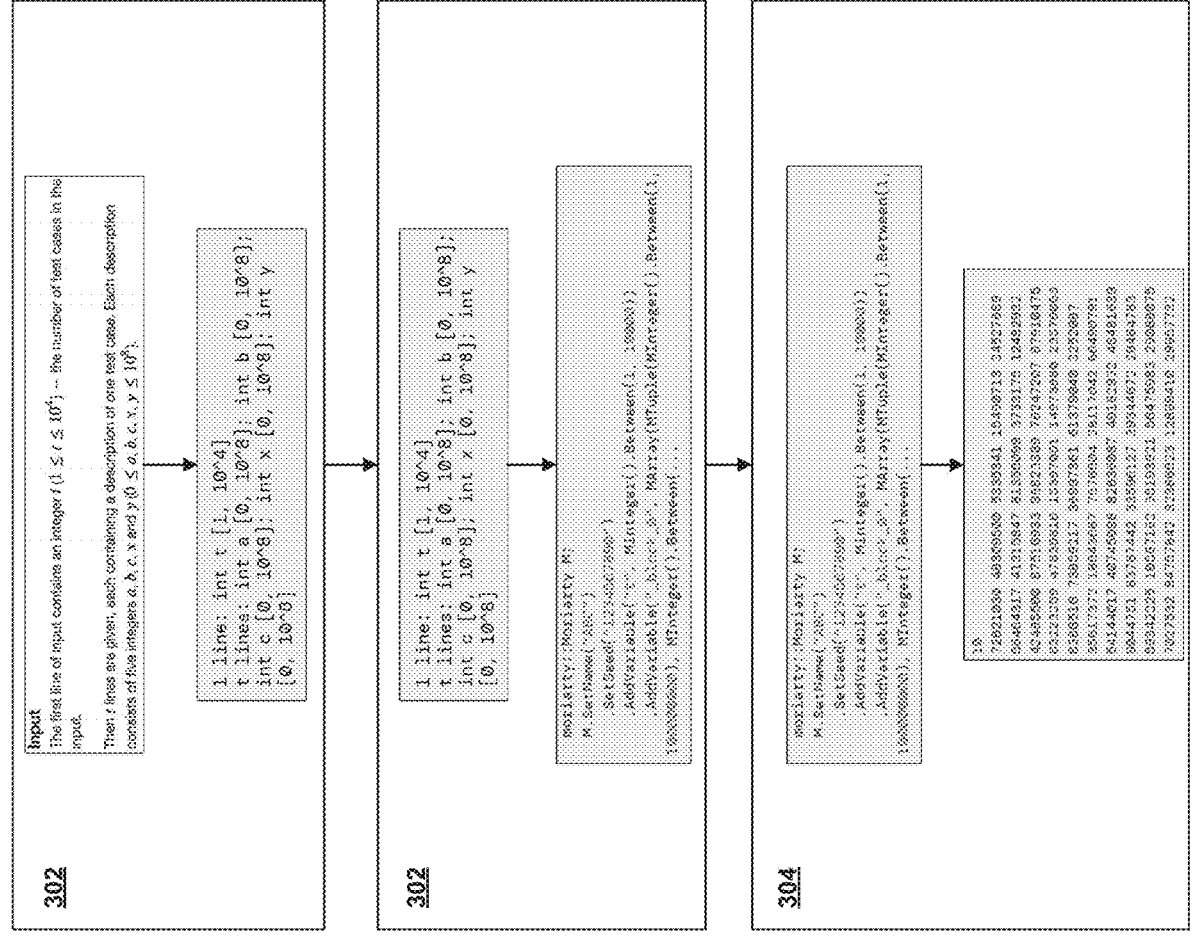
FIG. 3 shows an example of generating one or more test inputs from a specification of the inputs.

FIG. 3 shows an example 300 of generating one or more test inputs from a specification of the inputs. For convenience, the process 300 will be described as being performed by a system of one or more computers located in one or more locations. For example, a code generation system, e.g., the code generation system 100 of FIG. 1, appropriately programmed in accordance with this specification, can perform the process 300.

The system processes a description sequence generated from the natural language description using a language model neural network to generate a specification of the inputs to the computer programming task in a compact domain specific language (step 302).

That is, the system uses a test input generation neural network to process a natural language description of the inputs (e.g., the one or more description sequences describing the requirements of the input for the task that can be a subset of the description data) and generate a specification in accordance with the description of the inputs in a compact domain specific language.

Step 302 of FIG. 3 illustrates how a natural language description can be converted into, for this example, a competitive programming specification. In particular, the natural language description describes a file for t test inputs (one per line,) where test inputs must contain values for five integer variables with specific constraints.

The specification of the inputs identifies each variable that is included in a given input and specifies a respective set of constraints on a value of each of the variables. For example, the natural language description describes the variable y as being an integer constrained to be greater than or equal to zero and less than or equal to $10^{8}$ is represented in the specification as "int y [0, $10^{8}$];".

The system can perform the conversion of the natural language description of the inputs into the parseable competitive programming specification by, for example, few-shot prompting a language model, e.g., the Chinchilla model, with examples of natural language description and corresponding specifications, and then providing the natural language description to generate the specification.

The system generates the one or more test inputs from the specification of the inputs to the computer programming task.

For this particular example, the system first executes a pre-defined computer programming function (step 304) to parse the specification to determine the attributes of a test generator object. Then the system executes an API call to instantiate a programming language class object (i.e., the test generator object) with arguments determined through parsing the specification.

Step 304 of FIG. 3 illustrates how the system's execution of the pre-defined computer programming function results in the information of the input variables contained in the specification being used to instantiate a C++ class object.

For this particular example, the system then can repeatedly call the test generator object (i.e., the system can execute a member function of the test generator object) to generate test inputs that satisfy the original natural language description for the test inputs (step 306).

Step 306 of FIG. 3 illustrates how the system's call to the C++ class object results in an output that contains ten test inputs.

Figure 4:
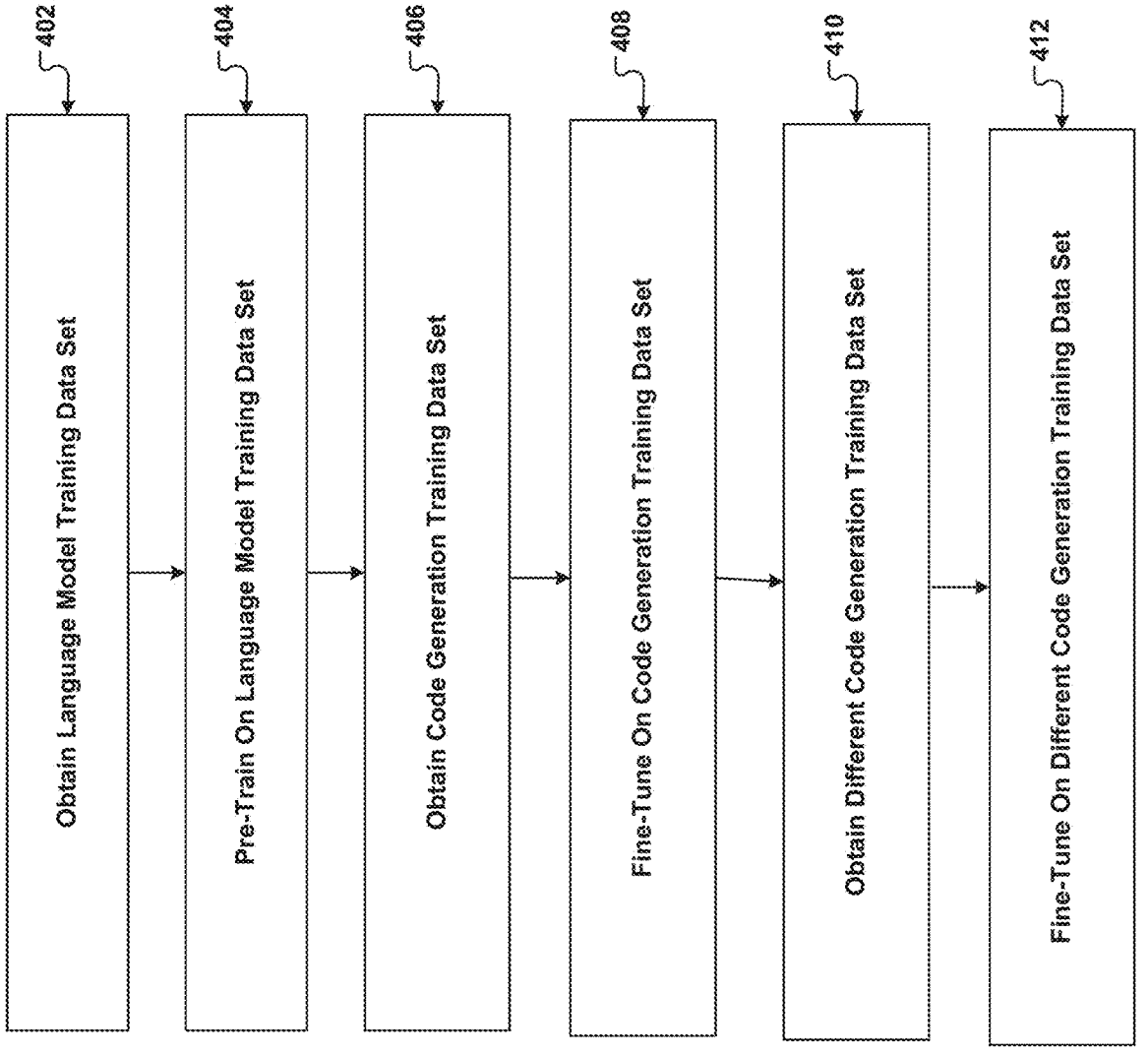
FIG. 4 is a flow diagram of an example process for training a generative neural network.

FIG. 4 is a flow diagram of an example process 400 for training a generative neural network. For convenience, the process 400 will be described as being performed by a system of one or more computers located in one or more locations. For example, a code generation system, e.g., the code generation system 100 of FIG. 1, appropriately programmed in accordance with this specification, can perform the process 400.

Although the example process 400 provides details for training a generative neural network, it should be understood that this process is not limited to a single instance of training a single generative neural network. Instead, it is an example of a training process used for one or more generative neural networks (e.g., the one or more generative neural networks 104 of FIG. 1).

The system obtains a language model training data set (step 402).

The language model training data set includes set of sequences that each represent a segment of computer code.

For example, the system can obtain a repository of computer code segments, e.g., computer code files or portions of computer code files, that includes compute code segments written in multiple computer programming languages. The system can then generate the first set of training data by "flattening" each computer code segment into a sequence, e.g., by removing white space or by replacing white space with a designated token.

Thus, the first set of training data includes sequences representing computer code but does not include any task descriptions describing the task that was accomplished by a given computer code segment (apart from any task information that would be embedded in comments within the computer code segment).

The system pre-trains the generative neural network on the language model training data set (step 404).

In particular, the system trains the generative neural network on the language model training data set on a language modeling objective that requires the generative neural network to predict, given a subsequence of tokens from a given sequence in the first set of training data, the tokens that follow the given subsequence of tokens within the given sequence.

For example, when the neural network has an encoder-decoder architecture as described above, the system can sample a pivot point within each sequence. The system can then generate a training example that includes, as input, the tokens before the pivot point in the sequence and, as a target output, the tokens after the pivot point in the sequence.

The language modeling objective can then require the neural network to predict the target output in each training example by processing the input sequence in the training example.

For example, the language modeling objective can be a cross-entropy next-token prediction loss for the decoder given the encoded representations of the input sequence in the training example generated by the encoder.

Optionally, the system can include one or more auxiliary losses as part of the pre-training.

For example, the system can incorporate a masked language modeling loss on the predictions of the encoder during the pre-training. Masked language modeling losses are described in more detail in J. Devlin, M.-W. Chang, K. Lee, and K. Toutanova. BERT: Pre-training of deep bidirectional transformers for language understanding. arXiv preprint arXiv: 1810.04805, 2018.

While the pre-training data set does not include task descriptions and therefore does not directly train the generative neural network to perform the code generation task, the pre-training stage can help the generative neural network to learn good representations of code and to generate code fluently. As a result, the model can reasonably represent the space of human coding, which greatly reduces the problem search space.

Steps 402 and 404 are optional and may not be necessary in all implementations. In some cases, as described above, the system may initialize the generative neural network from a pre-trained language model neural network.

The system obtains a code generation training data set for fine-tuning the generative neural network (step 406).

The code generation training data set includes a plurality of training examples that each include (i) a training input sequence representing a computer programming task and (ii) a training output sequence that represents a computer program.

As described above, in some implementations, after training, the inputs to the generative neural network include "metadata" tokens that each specify properties of the output sequence to be generated by the neural network.

In these implementations, the system also augments each training input sequence with metadata tokens that specify the corresponding actual properties of the computer program represented by the output sequence in the training example.

In some of these implementations, the system can leverage this metadata to allow the system to incorporate incorrect computer programs into the training.

In particular, the training examples can include both a) a first subset of training examples for which the training output sequence in the training example is a correct solution to the computer programming task represented by the training input sequence in the training example and b) a second set of training examples for which the training output sequence in the training example is not a correct solution to the computer programming task represented by the training input sequence in the training example. For each training example in a), the system includes metadata tokens indicating a correct solution while for each training example in b), the system includes metadata tokens indicating an incorrect solution. This provides an additional training signal and allowing use of data which could otherwise mislead the model.

The system fine-tunes the generative neural network on the code generation training data set (step 408).

That is, the system trains the generative neural network on an objective that encourages the generative neural network to generate computer programs that accurately carry out the task specified by the input sequence in each training example.

In some implementations, the system employs "tempering" during the training. Tempering is a regularization technique that makes the token probability distribution generated by the generative neural network artificially smoother or sharper at training time by dividing the output logits of the neural network, i.e., the scores generated by the penultimate layer of the neural network, by a scalar temperature T before the softmax layer. When tempering is employed, the system uses a temperature T between zero and one, exclusive. Using a temperature in this range can avoid overfitting to the fine-tuning data set by making the training distribution sharper, and consequently the inference distribution smoother. For example, the system can set T equal to 0.1, 0.2, or 0.4.

In these implementations, at sampling time, the system divides the logits by another temperature T' between zero and one, exclusive. For example, the system can determine T' by tuning the value on a validation set after training.

In some implementations, the system uses maximum likelihood as the code generation objective.

In some other implementations, the system uses a GOLD objective as the code generation objective. GOLD is an offline reinforcement learning algorithm which adds an off-policy importance weight to the standard maximum likelihood objective gradient. Using a GOLD objective can account for the fact that code generation based on task descriptions is inherently a one-of-many task: each task problem allows many distinct solutions that depend on algorithm choice, implementation, and so on. Standard maximum likelihood objectives minimize loss by putting some weight on each solution in the training set (like recall), whereas the goal of the system is to place weight on a single correct solution that is within the budget (like precision). GOLD can account for this by adding the off-policy importance weight, which allows the model to both learn from tokens it already assigns high likelihood to, and to ignore tokens that are not in its distribution. This way, the model can concentrate on precision rather than recall, and increase its chance of getting at least one correct sample. More specifically, the gradient of the GOLD objective satisfies:

$$\nabla \mathcal{L}_{GOLD}(\theta) = - \sum_{s \in Solution\ tokens} P_\theta(s) \nabla \log P_\theta(s),$$

where $\theta$ are the parameters of the generative neural network, the solution tokens are the tokens in the output sequence in the training example, and $P_\theta(s)$ is the probability assigned to token $s$ by the generative neural network.

In some cases, to mitigate instabilities during training, the system replaces(s) in the importance weight above with $\max(P_\theta(s)^\alpha, \beta)$, with $\alpha=12$ and $\beta=0.05$.

In some of these implementations, the objective is GOLD with tempering. In these implementations, the system can first divide the logits by the temperature before computing the loss, so both the log loss term and the importance weight use the tempered distribution.

Optionally, the system can include one or more auxiliary losses as part of the fine-tuning.

For example, the system can incorporate a masked language modeling loss on the predictions of the encoder during the fine-tuning. Masked language modeling losses are described in more detail in J. Devlin, M.-W. Chang, K. Lee, and K. Toutanova. BERT: Pre-training of deep bidirectional transformers for language understanding. arXiv preprint arXiv: 1810.04805, 2018.

As another example, the system can incorporate a value prediction auxiliary task into the training of the decoder. In this example, the last layer token representations before projecting to logits are also used in a prediction head, e.g., a small Transformer, to classify whether the generated computer program is correct or incorrect.

As described above, the system can make any of several adjustments to the training and sampling process in order to improve the performance of the system. Table 1 shows the impact of some of these adjustments on the performance on the system on a task that requires submitting 10 synthesized programs for each natural language description and is determined to be successfully performs when one or more out of the 10 programs successfully performs the task.

TABLE 1

| Setting | Solve rate |
| --- | --- |
| +No enhancements | 19.6% (18.2-20.4) |
| +Masked language modeling | 20.7% (19.1-21.3) |
| +Tempering | 21.9% (21.3-23.0) |
| +Random tags and ratings | 22.4% (21.3-23.0) |
| +Value prediction | 23.2% (21.7-23.9) |
| +GOLD | 24.2% (23.1-24.4) |
| +Clustering | 28.4% (27.5-29.3) |

Each row of Table 1 shows the solve rate of a system that uses the adjustment named in the row and all of the adjustments named in any rows above the row, with numbers in parentheses being a 95% confidence interval for the solve rate. The "solve rate" is the percentage of inputs for the above-described task for which the system generated a successful program. Row 2, "no enhancement," corresponds to using a neural network fine-tuned with standard next-token prediction loss (no GOLD or tempering and no masked language modeling or value prediction auxiliary losses at training and no clustering at sampling time). The last row, on the other hand, corresponds to using the "no enhancements" system but with masked language modeling, tempering, random tags and ratings (using "meta data conditioning" with randomly selected tags and ratings as described above), value prediction, GOLD, and clustering at sampling time. As can be seen from Table 1, each adjustment improves the performance of the system relative to a system that does not include the adjustment.

The following steps 410 and 412 are optional and may not be necessary in all implementations. But in some cases, as described above, after the system fine-tunes each generative neural network, the system further fine-tunes each generative neural network on a respective second set of code generation training data. In which case, the system performs steps 410 and 412.

The system obtains different code generation training data set for fine-tuning the generative neural network (step 410). That is, the system obtains code generation training data set that is not the code generation training data set of step 406.

Generally, the different code generation training data set of step 410 can have all the same properties of the code generation training data set of step 406. That is, for step 410, the different code generation training data set also includes a plurality of training examples that each include (i) a training input sequence representing a computer programming task and (ii) a training output sequence that represents a computer program; the training input sequence can also be augmented with metadata tokens; and the system can leverage this metadata to allow the system to incorporate incorrect computer programs into the training, as described above.

But, in some cases, the different code generation training data set of step 410 contain "higher-quality" data. That is, the different code generation training data set of step 410 can differ in terms of any of a variety of characteristics with respect to the code generation training data set of step 406.

For example, the different code generation training data set of step 410 may include data that is more contextually relevant to new input for the computer programming task.

As a particular example, the different code generation training data set of step 410 may include training output sequence that represents a computer program only of a particular compilation language dialect (e.g., C++11), while the code generation training data set of step 406 includes a variety of compilation language dialects (e.g., C++98, C++11, C++26, etc.).

As another particular example, the different code generation training data set of step 410 may include training input sequences that include metadata tokens only identifying a single difficulty rating, while the code generation training data set of step 406 includes training input sequences that includes metadata tokens identifying a variety of difficulty ratings.

As another particular example, the different code generation training data set of step 410 may include training input sequences that include the same one or more tags that each identify an algorithm that should be implemented by the output sequence generated by the generative neural network, while the code generation training data set of step 406 includes a variety of one or more tags that each identify an algorithm that should be implemented by the output sequence generated by the generative neural network.

As another particular example, the different code generation training data set of step 410 may include training examples from a single source, while the code generation training data set of step 406 includes training examples from a variety of sources.

Although these particular examples describe the different code generation training data set of step 410 having less diversity in types of training examples than the code generation training data set of step 406, the converse can be true. That is, the different code generation training data set of step 410 can have greater diversity in types of training examples than the code generation training data set of step 406. For example, the different code generation training data set of step 410 may include training output sequence that represents a computer program of a variety of compilation language dialects (e.g., C++98, C++11, C++26, etc.), while the code generation training data set of step 406 includes only a particular compilation language dialect (e.g., C++11).

As another example, the different code generation training data set of step 410 may include computer programs with annotated "chain of thought information" (i.e., natural language description of steps) interleaved with the program's lines of code in the form of code comments, while the code generation training data set of step 406 does not.

As another example, the different code generation training data set of step 410 may include input sequences that includes a natural language description of the computer program (i.e., an editorial description of the computer program), while the code generation training data set of step 406 does not.

As another example, the different code generation training data set of step 410 may include only computer programs that complete execution on particular inputs faster than a specified threshold, while the code generation training data set of step 406 does not.

As another example, the different code generation training data set of step 410 may include data that humans have carefully revised for errors, while the code generation training data set of step 406 does not.

As another example, the different code generation training data set of step 410 may include examples of computer tasks and respective computer programs that are much more complex, while the code generation training data set of step 406 does not.

The system fine-tunes the generative neural network on the different code generation training data set (step 412).

Generally, the fine-tuning process of step 412 can have all the same properties as the fine-tuning process of step 408. That is, for step 412, the system also trains the generative neural network on an objective that encourages the generative neural network to generate computer programs that accurately carry out the task specified by the input sequence in each training example; the system can also employ "tempering"; the system can also use maximum likelihood as the code generation (e.g., GOLD objective); and the system can also include one or more auxiliary losses (e.g., masked language modeling loss, value prediction, and so on).

An advantage of the system performing the optional steps 410 and 412 is that these steps can allow the system to train the generative neural network for better generalization and specialization efficiently with limited high-quality data. That is, the first round of fine-tuning (steps 406-408) can be used to train the generative neural network to have a general good performance for various tasks. While the second round of fine-tuning can ensure that the generative neural network learns from the potentially limited high-quality data for a specific task without overfitting.

For example, the system can fine-tune the generative neural network in a first round to generate computer programs to solve general computer programming tasks. Then the system can fine-tune the generative neural network further in a second round to specialize in sorting and searching tasks specifically.

Figure 5:
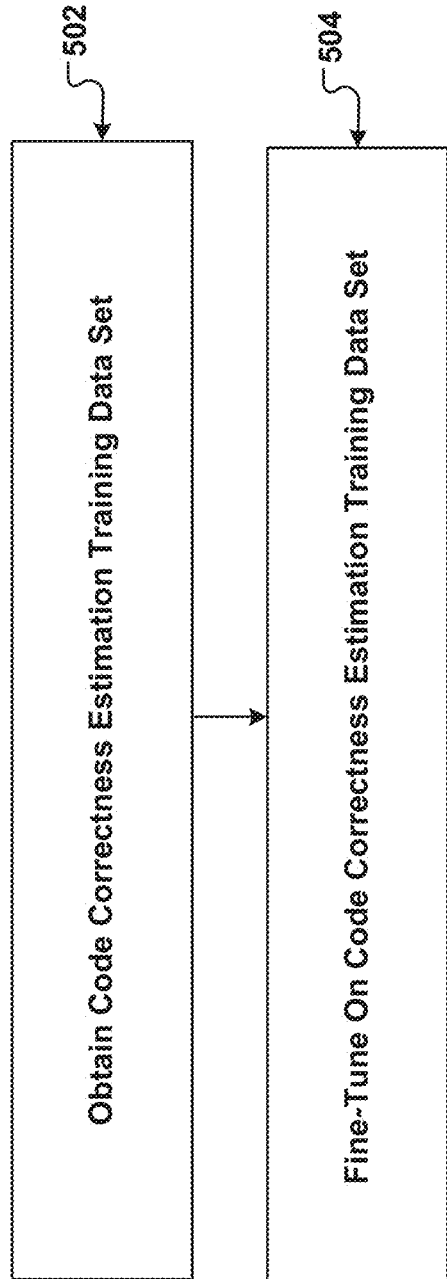
FIG. 5 is a flow diagram of an example process for training a correctness estimation neural network.

FIG. 5 is a flow diagram of an example process 500 for training a correctness generation neural network. For convenience, the process 500 will be described as being performed by a system of one or more computers located in one or more locations. For example, a code generation system, e.g., the code generation system 100 of FIG. 1, appropriately programmed in accordance with this specification, can perform the process 500.

The system obtains a correctness estimation training data set for fine-tuning the correctness estimation neural network (step 502).

The correctness estimation training data set includes a plurality of training examples, and each training example includes a respective computer program.

Generally, these training examples include a correctness input sequence that the correctness estimation neural network uses to generate a correctness score and labels indicating if the respective computer program within the correctness input sequence is correct or incorrect.

For example, the training examples can include the code generation training data set training examples, e.g., the code generation training data set that includes both correct and incorrect computer programs and metadata tokens that specify whether the computer program is correct or incorrect. In particular, the system can use the metadata tokens specifying correctness to label the training example as correct or incorrect (e.g., "CORRECT SOLUTION" can be mapped to numerical label 1.0 and "INCORRECT SOLUTION" can be mapped to numerical representation 0.0) and then include any other metadata tokens, the training input sequence representing a computer programming task, and the training output sequence that represents a computer program into a correctness input sequence.

In some cases, the training examples include computer programs generated by one or more machine learning models and human-generated computer programs.

For example, the training data set can include, for many different computer programming tasks, incorrect computer programs, purposely generated to be so by the generative neural network(s) 104 through appropriate metadata conditioning (i.e., metadata tokens indicating the output sequence should specify an incorrect solution for the computer programming task). Additionally, the training data set can include human-generated correct computer programs, e.g., user verified or user generated correct programs for tasks.

The system fine-tunes the correctness estimation neural network on the correctness estimation training data set (step 504).

That is, the system trains the correctness estimation neural network on an objective that encourages the correctness estimation neural network to generate a correctness score for a candidate computer program that estimates a likelihood that the candidate computer program accurately performs the computer programming task.

In some cases, the system trains the correctness estimation neural network starting from the pre-trained generative neural network after step 404 of example process 400.

In some cases, the system uses a cross-entropy based objective to fine-tune the correctness estimation neural network.

For example, the system can repeatedly, for each training example, process the correctness input sequence using the correctness estimation neural network to generate a correctness score, and then compare the correctness score against the training example label (e.g., the label indicating "CORRECT SOLUTION" or "INCORRECT SOLUTION" as numerical representation 1.0 or 0.0) to compute an objective. Then the system can compute the scaled negative gradient of the objective, e.g., cross-entropy loss, to update the parameters of the correctness estimation neural network. Thus, the system can backpropagate gradients of the objective to update the learnable parameters of the correctness estimation neural network, e.g., using any appropriate gradient descent optimization algorithm, such as Adam or another optimization algorithm, and any appropriate stopping criteria, e.g., maximum number of iterations, convergence of change in objective, time limit, and so on.

Figure 6:
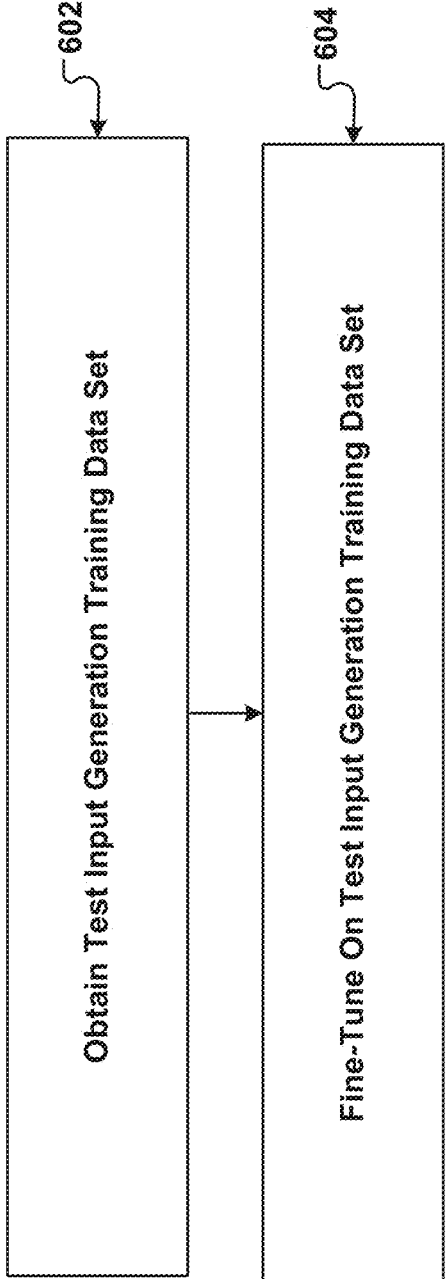
FIG. 6 is a flow diagram of an example process for test input generation neural network.

FIG. 6 is a flow diagram of an example process 600 for training an input generation neural network. For convenience, the process 600 will be described as being performed by a system of one or more computers located in one or more locations. For example, a code generation system, e.g., the code generation system 100 of FIG. 1, appropriately programmed in accordance with this specification, can perform the process 600.

The system obtains test input generation training data set for fine-tuning the test input generation neural network (step 602).

The test input generation training data set includes a plurality of training examples, and each training example includes description sequences (i.e., the plurality of text tokens from the description data describing the requirements of inputs for the computer programming task) and one or more respective test inputs for the description sequence.

The system fine-tunes the test input generation neural network on the test input generation training data set (step 604).

That is, the system trains the test input generation neural network on an objective that encourages the test input generation neural network to generate one or more test inputs.

In some cases, the fine-tuning objective can be to predict test inputs from problem descriptions, using known test inputs as target outputs. For example, the objective can be a maximum log likelihood objective with multiple references.

In some implementations, the system can train the test input generation neural network starting from the pre-trained generative neural network after step 404 of example process 400.

For cases where the test input generation neural network is used to generate a specification of the inputs to the computer programming task, the process for training an input generation neural network is optional. Instead, the system can use a pre-trained generative neural network, e.g., the pre-trained generative neural network after step 404 of example process 400, without further training to generating the one or more test inputs from the specification of the inputs to the computer programming task.

Figure 7:
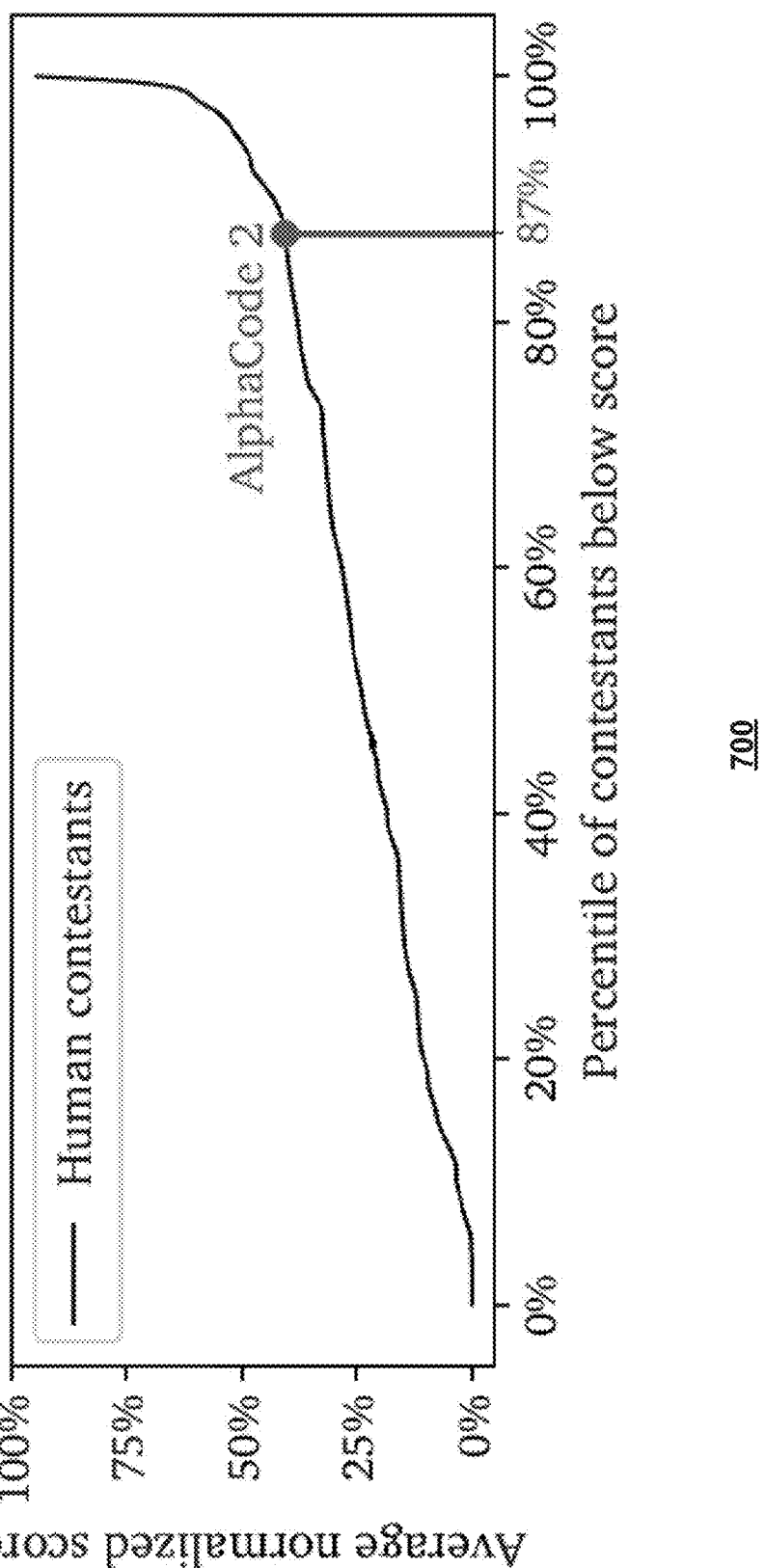
FIG. 7 shows an example of the performance of the describe techniques.

FIG. 7 shows an example 700 of the performance of the described techniques.

More specifically, FIG. 7 shows how the described techniques (i.e., AlphaCode 2) ranks in simulated programming competitions hosted on the popular Codeforces platform (a popular platform for competitive programming contests). For 12 recent contests with more than 8000 participants, either from division 2 or the harder division "1+2" and 77 computer programming tasks, the described techniques (i.e., AlphaCode 2) performs better than ~85% of real human entrants, ranking just between the 'Expert' and 'Candidate Master' categories on Codeforces.

In particular, the example 700 shows a plot of the Codeforces score of human competitors-normalized to [0, 1] by dividing by the best human score per contest—against their ranking, averaged on the 12 contests. The described techniques' (i.e., AlphaCode 2's) average normalized score is reported on the ranking axis at roughly the 85th percentile. This ranking accounts for a simulated time penalty assuming that AlphaCode 2 goes through the problems by increasing difficulty, and finishes sampling for the last problem at the 2 hour mark.

This example 700 performance suggests the describe techniques can efficiently leverage a set of one or more generative neural networks to accurately generate computer programs conditioned on natural language descriptions and address the problem of searching the huge, structured space by using generative neural networks. All while producing computer programs that outperform 85% of computer programs produced by expert human competitive programmers.

In this specification, the term "configured" is used in relation to computing systems and environments, as well as computer program components. A computing system or environment is considered "configured" to perform specific operations or actions when it possesses the necessary software, firmware, hardware, or a combination thereof, enabling it to carry out those operations or actions during operation. For instance, configuring a system might involve installing a software library with specific algorithms, updating firmware with new instructions for handling data, or adding a hardware component for enhanced processing capabilities. Similarly, one or more computer programs are "configured" to perform particular operations or actions when they contain instructions that, upon execution by a computing device or hardware, cause the device to perform those intended operations or actions.

The embodiments and functional operations described in this specification can be implemented in various forms, including digital electronic circuitry, software, firmware, computer hardware (encompassing the disclosed structures and their structural equivalents), or any combination thereof. The subject matter can be realized as one or more computer programs, essentially modules of computer program instructions encoded on a tangible non-transitory storage medium for execution by or to control the operation of a computing device or hardware. The storage medium can be a storage device such as a hard drive or solid-state drive (SSD), a storage medium, a random or serial access memory device, or a combination of these. Additionally or alternatively, the program instructions can be encoded on a transmitted signal, such as a machine-generated electrical, optical, or electromagnetic signal, designed to carry information for transmission to a receiving device or system for execution by a computing device or hardware. Furthermore, implementations may leverage emerging technologies like quantum computing or neuromorphic computing for specific applications, and may be deployed in distributed or cloud-based environments where components reside on different machines or within a cloud infrastructure.

The term "computing device or hardware" refers to the physical components involved in data processing and encompasses all types of devices and machines used for this purpose. Examples include processors or processing units, computers, multiple processors or computers working together, graphics processing units (GPUs), tensor processing units (TPUs), and specialized processing hardware such as field-programmable gate arrays (FPGAs) or application-specific integrated circuits (ASICs). In addition to hardware, a computing device or hardware may also include code that creates an execution environment for computer programs. This code can take the form of processor firmware, a protocol stack, a database management system, an operating system, or a combination of these elements. Embodiments may particularly benefit from utilizing the parallel processing capabilities of GPUs, in a General-Purpose computing on Graphics Processing Units (GPGPU) context, where code specifically designed for GPU execution, often called kernels or shaders, is employed. Similarly, TPUs excel at running optimized tensor operations crucial for many machine learning algorithms. By leveraging these accelerators and their specialized programming models, the system can achieve significant speedups and efficiency gains for tasks involving artificial intelligence and machine learning, particularly in areas such as computer vision, natural language processing, and robotics.

A computer program, also referred to as software, an application, a module, a script, code, or simply a program, can be written in any programming language, including compiled or interpreted languages, and declarative or procedural languages. It can be deployed in various forms, such as a standalone program, a module, a component, a subroutine, or any other unit suitable for use within a computing environment. A program may or may not correspond to a single file in a file system and can be stored in various ways. This includes being embedded within a file containing other programs or data (e.g., scripts within a markup language document), residing in a dedicated file, or distributed across multiple coordinated files (e.g., files storing modules, subprograms, or code segments). A computer program can be executed on a single computer or across multiple computers, whether located at a single site or distributed across multiple sites and interconnected through a data communication network. The specific implementation of the computer programs may involve a combination of traditional programming languages and specialized languages or libraries designed for GPGPU programming or TPU utilization, depending on the chosen hardware platform and desired performance characteristics.

In this specification, the term "engine" broadly refers to a software-based system, subsystem, or process designed to perform one or more specific functions. An engine is typically implemented as one or more software modules or components installed on one or more computers, which can be located at a single site or distributed across multiple locations. In some instances, one or more dedicated computers may be used for a particular engine, while in other cases, multiple engines may operate concurrently on the same one or more computers. Examples of engine functions within the context of AI and machine learning could include data pre-processing and cleaning, feature engineering and extraction, model training and optimization, inference and prediction generation, and post-processing of results. The specific design and implementation of engines will depend on the overall architecture and the distribution of computational tasks across various hardware components, including CPUs, GPUs, TPUs, and other specialized processors.

The processes and logic flows described in this specification can be executed by one or more programmable computers running one or more computer programs to perform functions by operating on input data and generating output. Additionally, graphics processing units (GPUs) and tensor processing units (TPUs) can be utilized to enable concurrent execution of aspects of these processes and logic flows, significantly accelerating performance. This approach offers significant advantages for computationally intensive tasks often found in AI and machine learning applications, such as matrix multiplications, convolutions, and other operations that exhibit a high degree of parallelism. By leveraging the parallel processing capabilities of GPUs and TPUs, significant speedups and efficiency gains compared to relying solely on CPUs can be achieved. Alternatively or in combination with programmable computers and specialized processors, these processes and logic flows can also be implemented using specialized processing hardware, such as field-programmable gate arrays (FPGAs) or application-specific integrated circuits (ASICs), for even greater performance or energy efficiency in specific use cases.

Computers capable of executing a computer program can be based on general-purpose microprocessors, special-purpose microprocessors, or a combination of both. They can also utilize any other type of central processing unit (CPU). Additionally, graphics processing units (GPUs), tensor processing units (TPUs), and other machine learning accelerators can be employed to enhance performance, particularly for tasks involving artificial intelligence and machine learning. These accelerators often work in conjunction with CPUs, handling specialized computations while the CPU manages overall system operations and other tasks. Typically, a CPU receives instructions and data from read-only memory (ROM), random access memory (RAM), or both. The elements of a computer include a CPU for executing instructions and one or more memory devices for storing instructions and data. The specific configuration of processing units and memory will depend on factors like the complexity of the AI model, the volume of data being processed, and the desired performance and latency requirements. Embodiments can be implemented on a wide range of computing platforms, from small, embedded devices with limited resources to large-scale data center systems with high-performance computing capabilities. The system may include storage devices like hard drives, SSDs, or flash memory for persistent data storage.

Computer-readable media suitable for storing computer program instructions and data encompass all forms of non-volatile memory, media, and memory devices. Examples include semiconductor memory devices such as read-only memory (ROM), solid-state drives (SSDs), and flash memory devices; hard disk drives (HDDs); optical media; and optical discs such as CDs, DVDs, and Blu-ray discs. The specific type of computer-readable media used will depend on factors such as the size of the data, access speed requirements, cost considerations, and the desired level of portability or permanence.

To facilitate user interaction, embodiments of the subject matter described in this specification can be implemented on a computing device equipped with a display device, such as a liquid crystal display (LCD) or an organic light-emitting diode (OLED) display, for presenting information to the user. Input can be provided by the user through various means, including a keyboard), touchscreens, voice commands, gesture recognition, or other input modalities depending on the specific device and application. Additional input methods can include acoustic, speech, or tactile input, while feedback to the user can take the form of visual, auditory, or tactile feedback. Furthermore, computers can interact with users by exchanging documents with a user's device or application. This can involve sending web content or data in response to requests or sending and receiving text messages or other forms of messages through mobile devices or messaging platforms. The selection of input and output modalities will depend on the specific application and the desired form of user interaction.

Machine learning models can be implemented and deployed using machine learning frameworks, such as TensorFlow or JAX. These frameworks offer comprehensive tools and libraries that facilitate the development, training, and deployment of machine learning models.

Embodiments of the subject matter described in this specification can be implemented within a computing system comprising one or more components, depending on the specific application and requirements. These may include a back-end component, such as a back-end server or cloud-based infrastructure; an optional middleware component, such as a middleware server or application programming interface (API), to facilitate communication and data exchange; and a front-end component, such as a client device with a user interface, a web browser, or an app, through which a user can interact with the implemented subject matter. For instance, the described functionality could be implemented solely on a client device (e.g., for on-device machine learning) or deployed as a combination of front-end and back-end components for more complex applications. These components, when present, can be interconnected using any form or medium of digital data communication, such as a communication network like a local area network (LAN) or a wide area network (WAN) including the Internet. The specific system architecture and choice of components will depend on factors such as the scale of the application, the need for real-time processing, data security requirements, and the desired user experience.

The computing system can include clients and servers that may be geographically separated and interact through a communication network. The specific type of network, such as a local area network (LAN), a wide area network (WAN), or the Internet, will depend on the reach and scale of the application. The client-server relationship is established through computer programs running on the respective computers and designed to communicate with each other using appropriate protocols. These protocols may include HTTP, TCP/IP, or other specialized protocols depending on the nature of the data being exchanged and the security requirements of the system. In certain embodiments, a server transmits data or instructions to a user's device, such as a computer, smartphone, or tablet, acting as a client. The client device can then process the received information, display results to the user, and potentially send data or feedback back to the server for further processing or storage. This allows for dynamic interactions between the user and the system, enabling a wide range of applications and functionalities.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving description data describing a computer programming task, the description data comprising a plurality of text tokens;

generating a plurality of initial candidate computer programs, the generating comprising sampling a plurality of output sequences from a set of one or more generative neural networks, wherein each generative neural network in the set is deployed as a plurality of instances on a respective set of one or more devices, and wherein each instance of each generative neural network in the set is configured to, in parallel with each other instance of each generative neural network, receive an input sequence that includes the plurality of text tokens in the description data and to process the input sequence to generate an output sequence comprising a plurality of computer code tokens that specifies an initial candidate computer program for performing the computer programming task described by the description data, wherein each initial candidate computer program is specified by a respective one of the plurality of output sequences;

filtering the plurality of initial candidate computer programs to generate a plurality of candidate computer programs, wherein the filtering comprises:

compiling each of the initial candidate computer programs; and removing, from the plurality of initial candidate computer programs, any initial candidate computer program that fails to compile;

clustering the plurality of candidate computer programs to generate a plurality of clusters that each comprise a respective plurality of candidate computer programs;

ranking the plurality of clusters using at least a respective cardinality of each of the clusters;

selecting, for inclusion in a set of one or more clusters that includes less than all of the plurality of clusters, one or more highest-ranked clusters according to the ranking;

for each cluster in the set of one or more of the clusters:

processing each of the respective plurality of candidate computer programs in the cluster using a correctness estimation neural network to generate a correctness score for the candidate computer program that estimates a likelihood that the candidate computer program accurately performs the computer programming task; and selecting a representative computer program for the cluster using the correctness scores for the respective plurality of candidate computer programs in the cluster; and selecting one or more of the representative computer programs for the clusters as synthesized computer programs for performing the computer programming task.

2. The method of claim 1, further comprising:

obtaining a first set of one or more inputs for the computer programming task and, for each input in the first set, one or more expected outputs, wherein the filtering further comprises:

discarding any initial candidate computer program that does not generate, for each input in the first set, an output that matches any of the one or more expected outputs for the input.

3. The method of claim 1, wherein clustering the plurality of candidate computer programs comprises:

obtaining a test set of test inputs for the computer programming task;

for each candidate computer program and for each test input in the test set:

executing the candidate computer program on the test input to generate an output; and clustering the plurality of candidate computer programs based at least in part on the outputs generated by executing the candidate computer programs on the test inputs.

4. The method of claim 3, wherein obtaining the test set of test inputs for the computer programming task comprises:

processing a natural language description of inputs for the computer programming task using a test input generation neural network to generate as output one or more test inputs for the computer programming task.

5. The method of claim 4, wherein processing the natural language description using a test input generation neural network comprises:

processing a description sequence generated from the natural language description using a language model neural network to generate a specification of the inputs to the computer programming task in a compact domain specific language; and generating the one or more test inputs from the specification of the inputs to the computer programming task.

6. The method of claim 1, wherein each generative neural network has been fine-tuned on a respective first set of code generation training data in accordance with a respective set of hyperparameters.

7. The method of claim 6, wherein each generative neural network has been further fine-tuned on a respective second set of code generation training data.

8. The method of claim 1, wherein ranking the plurality of clusters using at least a respective cardinality of each of the clusters comprises:

ranking the plurality of clusters based on, for each of the clusters, a respective cardinality of the cluster and a respective measure of central tendency of correctness scores generated by the correctness estimation neural network for the candidate computer programs in the cluster.

9. The method of claim 1, further comprising:

receiving a new input for the computer programming task; and executing one or more of the synthesized computer programs on the new input to generate an output for the computer programming task for the new input.

10. The method of claim 1, wherein sampling a plurality of output sequences from a set of one or more generative neural networks comprises sampling each output sequence in accordance with a respective sampling temperature and wherein two or more output sequences are sampled with respective different sampling temperatures.

11. The method of claim 1, wherein one or more of the generative neural networks are causally-masked decoder-only Transformer neural networks.

12. The method of claim 1, wherein one or more of the generative neural networks in the set include:

an encoder neural network configured to process the input sequence to generate an encoded representation of the input sequence; and a decoder neural network configured to process the encoded representation to generate the output sequence.

13. The method of claim 12, wherein the encoder neural network is a Transformer encoder that applies self-attention over the input sequence and the decoder neural network is an auto-regressive Transformer decoder that applies cross-attention into the encoded representation.

14. The method of claim 1, wherein sampling a plurality of output sequences from a set of one or more generative neural networks comprises repeatedly performing operations comprising:

generating a current input sequence from the description data; and sampling one or more output sequences by processing the current input sequence using one of the generative neural networks in the set.

15. The method of claim 14, wherein each input sequence comprises the plurality of text tokens from the description data and one or more tokens identifying a programming language, and wherein generating a current input sequence from the description data comprises:

selecting a programming language; and including one or more tokens identifying the selected programming language in the current input sequence.

16. The method of claim 14, wherein generating a current input sequence from the description data comprises:

including one or more tokens indicating that the output sequence generated by the generative neural network will specify a correct solution for the computer programming task.

17. The method of claim 14, wherein each input sequence comprises the plurality of text tokens from the description data and zero or more tags that each comprise one or more tokens and that identify an algorithm that will be implemented by the output sequence generated by the generative neural network, and wherein generating a current input sequence from the description data comprises:

sampling one or more tags from a distribution over a set of tags; and including the sampled tags in the current output sequence.

18. The method of claim 14, wherein each input sequence comprises the plurality of text tokens from the description data and one or more tokens that specify a difficulty rating for the computer programming task, and wherein generating a current input sequence from the description data comprises:

selecting a difficulty rating for the computer programming task; and including one or more tokens specifying the selected difficulty rating in the current output sequence.

19. The method of claim 18, wherein selecting a difficulty rating for the computer programming task comprises:

selecting a fixed difficulty rating that is the same for all computer programming tasks after training of the generative neural networks.

20. The method of claim 18, wherein selecting a difficulty rating for the computer programming task comprises:

sampling a difficulty rating from a distribution over a set of difficulty ratings.

21. The method of claim 14, wherein each input sequence comprises the plurality of text tokens from the description data and a sequence of tokens that represent a natural language description of how to solve the computer programming task.

22. The method of claim 21, further comprising:

generating, from the description data, the sequence of tokens that represent the natural language description using an editorial generation neural network.

23. The method of claim 1, wherein each generative neural network has been pre-trained on a language model training objective on a language model training data set and fine-tuned on a code generation objective on a respective first set of code generation training data that includes a plurality of training examples that each include (i) a training input sequence representing a computer programming task and (ii) a training output sequence that represents a computer program.

24. The method of claim 23, wherein the plurality of training examples includes a first subset of training examples for which the training output sequence in the training example is a correct solution to the computer programming task represented by the training input sequence in the training example and a second set of training examples for which the training output sequence in the training example is not a correct solution to the computer programming task represented by the training input sequence in the training example.

25. The method of claim 1, wherein processing each of the respective plurality of candidate computer programs in the cluster using a correctness estimation neural network to generate a correctness score for the candidate computer program that estimates a likelihood that the candidate computer program accurately performs the computer programming task comprises, for each candidate computer program, processing a correctness input sequence generated from the candidate computer program using the correctness estimation neural network to generate a correctness score for the candidate computer program.

26. The method of claim 25, wherein the correctness input sequence is generated from the candidate computer program and at least a subset of the description data.

27. A system comprising one or more computers and one or more storage devices storing instructions that when executed by the one or more computers cause the one or more computers to perform operations comprising:

receiving description data describing a computer programming task, the description data comprising a plurality of text tokens;

generating a plurality of initial candidate computer programs, the generating comprising sampling a plurality of output sequences from a set of one or more generative neural networks, wherein each generative neural network in the set is deployed as a plurality of instances on a respective set of one or more devices, and wherein each instance of each generative neural network in the set is configured to, in parallel with each other instance of each generative neural network, receive an input sequence that includes the plurality of text tokens in the description data and to process the input sequence to generate an output sequence comprising a plurality of computer code tokens that specifies an initial candidate computer program for performing the computer programming task described by the description data, wherein each initial candidate computer program is specified by a respective one of the plurality of output sequences;

filtering the plurality of initial candidate computer programs to generate a plurality of candidate computer programs, wherein the filtering comprises:

compiling each of the initial candidate computer programs; and removing, from the plurality of initial candidate computer programs, any initial candidate computer program that fails to compile;

clustering the plurality of candidate computer programs to generate a plurality of clusters that each comprise a respective plurality of candidate computer programs;

ranking the plurality of clusters using at least a respective cardinality of each of the clusters;

selecting, for inclusion in a set of one or more clusters that includes less than all of the plurality of clusters, one or more highest-ranked clusters according to the ranking;

for each cluster in the set of one or more of the clusters:

processing each of the respective plurality of candidate computer programs in the cluster using a correctness estimation neural network to generate a correctness score for the candidate computer program that estimates a likelihood that the candidate computer program accurately performs the computer programming task; and selecting a representative computer program for the cluster using the correctness scores for the respective plurality of candidate computer programs in the cluster; and selecting one or more of the representative computer programs for the clusters as synthesized computer programs for performing the computer programming task.

28. The system of claim 27, wherein the operations further comprise:

obtaining a first set of one or more inputs for the computer programming task and, for each input in the first set, one or more expected outputs, wherein the filtering further comprises:

discarding any initial candidate computer program that does not generate, for each input in the first set, an output that matches any of the one or more expected outputs for the input.

29. The system of claim 27, wherein clustering the plurality of candidate computer programs comprises:

obtaining a test set of test inputs for the computer programming task;

for each candidate computer program and for each test input in the test set:

executing the candidate computer program on the test input to generate an output; and clustering the plurality of candidate computer programs based at least in part on the outputs generated by executing the candidate computer programs on the test inputs.

30. One or more non-transitory computer storage media storing instructions that when executed by one or more computers cause the one or more computers to perform operations comprising:

receiving description data describing a computer programming task, the description data comprising a plurality of text tokens;

generating a plurality of initial candidate computer programs, the generating comprising sampling a plurality of output sequences from a set of one or more generative neural networks, wherein each generative neural network in the set is deployed as a plurality of instances on a respective set of one or more devices, and wherein each instance of each generative neural network in the set is configured to, in parallel with each other instance of each generative neural network, receive an input sequence that includes the plurality of text tokens in the description data and to process the input sequence to generate an output sequence comprising a plurality of computer code tokens that specifies an initial candidate computer program for performing the computer programming task described by the description data, wherein each initial candidate computer program is specified by a respective one of the plurality of output sequences;

filtering the plurality of initial candidate computer programs to generate a plurality of candidate computer programs, wherein the filtering comprises:

compiling each of the initial candidate programs; and removing, from the plurality of initial candidate computer programs, any initial candidate computer program that fails to compile;

clustering the plurality of candidate computer programs to generate a plurality of clusters that each comprise a respective plurality of candidate computer programs;

ranking the plurality of clusters using at least a respective cardinality of each of the clusters;

selecting, for inclusion in a set of one or more clusters that includes less than all of the plurality of clusters, one or more highest-ranked clusters according to the ranking;

for each cluster in the set of one or more of the clusters:

processing each of the respective plurality of candidate computer programs in the cluster using a correctness estimation neural network to generate a correctness score for the candidate computer program that estimates a likelihood that the candidate computer program accurately performs the computer programming task; and selecting a representative computer program for the cluster using the correctness scores for the respective plurality of candidate computer programs in the cluster; and selecting one or more of the representative computer programs for the clusters as synthesized computer programs for performing the computer programming task.

* * * * *